US012795392B2

(12) United States Patent
Raghothaman et al.

(10) Patent No.: US 12,795,392 B2
(45) Date of Patent: Nov. 10, 2026

(54) SYSTEMS AND METHODS FOR CONSOLIDATED TWO-LEVEL BEAM MANAGEMENT

(71) Applicant: Outdoor Wireless Networks LLC, Richardson, TX (US)

(72) Inventors: Balaji B Raghothaman, Chester Springs, PA (US); Irfaan Ahamed Salahuddeen, Acton, MA (US); Stuart D. Sandberg, Acton, MA (US); Ehsan Daeipour, Southborough, MA (US); Naveen Shanmugaraju, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 329 days.

(21) Appl. No.: 18/607,072

(22) Filed: Mar. 15, 2024

(65) Prior Publication Data

US 2024/0314580 A1 Sep. 19, 2024

(30) Foreign Application Priority Data

Mar. 17, 2023 (IN) ............................. 202341018152

(51) Int. Cl.

*H04W 16/28* (2009.01)
*H04L 5/00* (2006.01)
*H04W 24/10* (2009.01)
*H04W 56/00* (2009.01)

(52) U.S. Cl.

CPC ........... *H04W 16/28* (2013.01); *H04L 5/0051* (2013.01); *H04W 24/10* (2013.01); *H04W 56/0015* (2013.01)

(58) Field of Classification Search

CPC . H04W 16/28; H04W 24/10; H04W 56/0015; H04L 5/0051

See application file for complete search history.

(56) References Cited

U.S. PATENT DOCUMENTS 9,380,466 B2 6/2016 Eyuboglu et al.
9,414,399 B2 8/2016 Eyuboglu et al.
9,936,470 B2 4/2018 Eyuboglu et al.
(Continued)

FOREIGN PATENT DOCUMENTS

WO 2016145371 A2 9/2016
WO 2017070635 A1 4/2017
WO 2018017468 A1 1/2018

*Primary Examiner* — Christine Ng
(74) *Attorney, Agent, or Firm* — Fogg & Powers LLC

(57) ABSTRACT

Systems and methods for consolidated two-level beam management for a base station that includes BBU(s) and a RU communicatively coupled to the BBU(s) are provided. In one example, a method includes receiving signal measurements for coarse beams from a UE; establishing a coarse beam association for the UE with a first coarse beam based on the signal measurements for the coarse beams from the UE; configuring the UE to measure reference signals associated with fine beams associated with the first coarse beam; receiving reference signal measurements for the fine beams from the UE; establishing a fine beam association for the UE with a first fine beam based on the reference signal measurements for the fine beams from the UE; transmitting synchronization signals to the UE using the first coarse beam; and transmitting data signals to UE using the first fine beam.

20 Claims, 20 Drawing Sheets

(56) References Cited

U.S. PATENT DOCUMENTS

| | | | | |
|---|---|---|---|---|
| 9,998,310 | B2 | 6/2018 | Barbieri et al. | |
| 10,057,916 | B2 | 8/2018 | Barabell et al. | |
| 10,097,391 | B2 | 10/2018 | Fertonani et al. | |
| 10,355,895 | B2 | 7/2019 | Barbieri et al. | |
| 2016/0165583 | A1* | 6/2016 | Ho | H04B 7/0695 370/329 |
| 2017/0373890 | A1 | 12/2017 | Fertonani et al. | |
| 2018/0227886 | A1* | 8/2018 | Chou | H04W 72/046 |
| 2018/0287696 | A1 | 10/2018 | Barbieri et al. | |
| 2018/0368126 | A1* | 12/2018 | Islam | H04W 16/28 |
| 2019/0007246 | A1 | 1/2019 | Fertonani et al. | |
| 2019/0116568 | A1 | 4/2019 | Fertonani et al. | |
| 2019/0208575 | A1 | 7/2019 | Barbieri et al. | |
| 2020/0007216 | A1* | 1/2020 | Nasiri Khormuji | H04B 7/063 |
| 2021/0112001 | A1* | 4/2021 | Li | H04L 69/22 |
| 2022/0052737 | A1* | 2/2022 | Shanmugaraju | H04B 7/0626 |
| 2022/0086709 | A1* | 3/2022 | Hao | H04W 16/28 |
| 2023/0042335 | A1* | 2/2023 | Li | H04W 24/08 |
| 2023/0361844 | A1* | 11/2023 | Li | H04B 7/043 |
| 2024/0422760 | A1* | 12/2024 | Wu | H04B 7/06964 |

* cited by examiner

Scenario 1:
RU: No Change
SSB Beam: No Change
Fine Beam: Change F27=>F28

Scenario 2:
RU: No Change
SSB Beam: Change S6=>S7
Fine Beam: Change F28=>F29

Scenario 4:

RU: Change

SSB Beam: Change S8=>S10

Fine Beam: Change F32=>F43

New SSB, FB are NOT 'true' neighbors'

Scenario 4

SYSTEMS AND METHODS FOR CONSOLIDATED TWO-LEVEL BEAM MANAGEMENT

CROSS-REFERENCE TO RELATED APPLICATIONS

This application claims benefit of India Provisional Application Ser. No. 202341018152, filed on Mar. 17, 2023, and titled "SYSTEMS AND METHODS FOR CONSOLIDATED TWO-LEVEL BEAM MANAGEMENT," the contents of which are incorporated herein in their entirety.

BACKGROUND

A centralized or cloud radio access network (C-RAN) is one way to implement base station functionality. Typically, for each cell (that is, for each physical cell identifier (PCI)) implemented by a C-RAN, one or more baseband unit (BBU) entities (also referred to here simply as "BBUs") interacts with multiple remote units (also referred to here as "RUs," "radio units," "radio points," or "RPs") implement a base station entity in order to provide wireless service to various items of user equipment (UEs). The BBU entities may comprise a single entity (sometimes referred to as a "baseband controller" or simply a "baseband band unit" or "BBU") that performs Layer-3, Layer-2, and some Layer-1 processing for the cell. The BBU entities may also comprises multiple entities, for example, one or more central unit (CU) entities that implement Layer 3 and non-time critical Layer 2 functions for the associated base station and one or more distribution units (DU) that implement the time critical Layer 2 functions and at least some of the Layer 1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple RUs are typically located remotely from each other (that is, the multiple RUs are not co-located), and the BBU entities are communicatively coupled to the RUs over a fronthaul network. The RUs may also be collocated (for example, in instances where each RU processes different carriers or time slices).

SUMMARY

In some aspects, a system is described herein. The system includes at least one baseband unit (BBU), a radio unit communicatively coupled to the at least one BBU, and a plurality of antennas communicatively coupled to the radio unit. The at least one BBU, the radio unit, and the plurality of antennas are configured to implement a base station for wirelessly communicating with user equipment in a cell. The base station is configured to receive signal measurements for a plurality of coarse beams from a first user equipment. The base station is further configured to establish a coarse beam association for a first user equipment with a first coarse beam of the plurality of coarse beams based on the signal measurements for the plurality of coarse beams from the first user equipment. The base station is further configured to configure the first user equipment to measure reference signals associated with a first set of fine beams, wherein the first set of fine beams is associated with the first coarse beam. The base station is further configured to receive reference signal measurements for the first set of fine beams from the first user equipment. The base station is further configured to establish a fine beam association for the first user equipment with a first fine beam of the first set of fine beams based on the reference signal measurements for the first set of fine beams from the first user equipment. The base station is further configured to transmit synchronization signals to first user equipment using the first coarse beam. The base station is further configured to transmit data signals to the first user equipment using the first fine beam.

In some aspects, a method of two-level beam management for a base station that includes at least one baseband unit (BBU) and a radio unit communicatively coupled to the at least one BBU is described herein. The method includes receiving signal measurements for a plurality of coarse beams from a first user equipment. The method further includes establishing a coarse beam association for the first user equipment with a first coarse beam of the plurality of coarse beams based on the signal measurements for the plurality of coarse beams from the first user equipment. The method further includes configuring the first user equipment to measure reference signals associated with a first set of fine beams, wherein the first set of fine beams is associated with the first coarse beam. The method further includes receiving reference signal measurements for the first set of fine beams from the first user equipment. The method further includes establishing a fine beam association for the first user equipment with a first fine beam of the first set of fine beams based on the reference signal measurements for the first set of fine beams from the first user equipment. The method further includes transmitting synchronization signals to the first user equipment using the first coarse beam. The method further includes transmitting data signals to first user equipment using the first fine beam.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
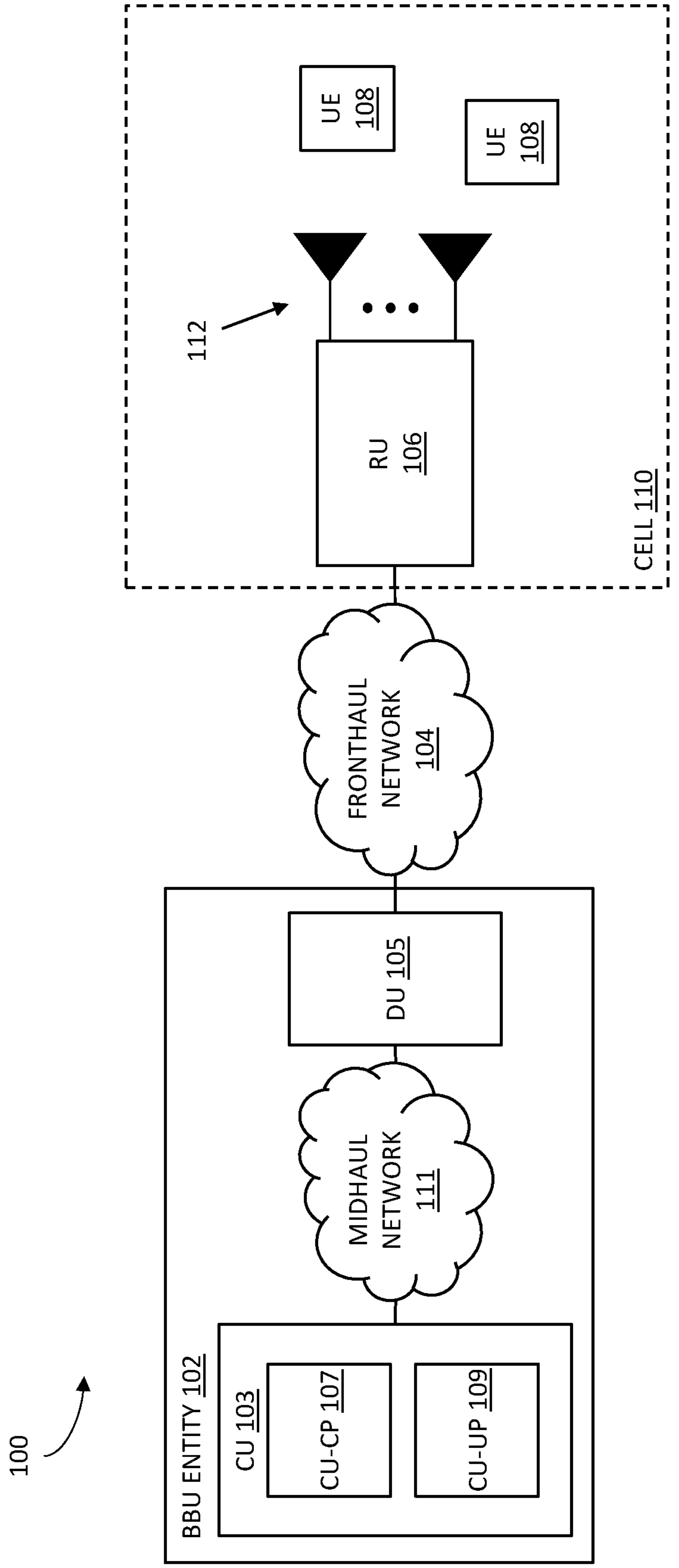
FIGS. 1A-1B are block diagrams illustrating an example radio access network.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used, and that logical, mechanical, and electrical changes may be made. The following detailed description is, therefore, not to be taken in a limiting sense.

In fifth generation (5G) New Radio (NR) systems, some fundamental aspects of the air interface are different from fourth generation (4G) systems. One key difference is the concept of beams. In particular, system information can be broadcast on a set of beams, and UEs are then able to be serviced on one of those beams based on which broadcast beam they receive with the best signal strength. The broadcast beams are also referred to as Synchronization Signal Block (SSB) beams or SSB-Public Broadcast Channel (PBCH) beams.

Single-level beam management is utilized for communication with UEs where each beam is assigned an SSB-PBCH Beam Index, and the same beam is used to transmit/receive data to/from the UE once a UE is associated with an SSB-PBCH Beam Index. Single-level beam management is relatively simple, but has quite a few drawbacks. The true benefits of mmWave deployments are obtained when using narrow, focused beamforming. In order to cover the anticipated or designed coverage area of an RU, the number of beams (and correspondingly the number of SSB beams) needs to be large. This can place a severe burden on resource management because each SSB beam needs a dedicated assignment of Physical Random Access Channel (PRACH) and Physical Uplink Control Channel (PUCCH) resources.

Further, while there is a maximum number of sixty-four SSB beams allowed in the Frequency Range 2 (FR2) specification, this maximum number is only applicable in the most favorable configuration of the base station. In the 4:1 TDD configuration (DDDSU), there are only a maximum of fifty-six SSB beams that are possible. Additionally, in order to support SSB occasions in the second half of a slot, a restriction on the Physical Downlink Shared Channel (PDSCH) type is needed. If this option is not supported by the system, then the total number of SSB beams available is reduced to twenty-eight.

Two alternatives are available for the twenty-eight-beam implementation using single-level beam management. First, twenty-eight wider beams could be used to cover the entire coverage area. However, from a hardware and RF design perspective, using only twenty-eight wider beams to cover the entire coverage area will result in a severe degradation of performance due to undulating coverage inducing uneven receive power profiles. Alternatively, the twenty-eight beams could be kept narrow, and the total coverage area of the RU could be reduced. However, this severely increases the system costs because the number of RUs needed to provide coverage will be substantially higher.

For at least the reasons above, improved techniques for beam management are needed for 5G NR base stations.

The example systems and methods described herein utilize a smaller number of coarse beams for synchronization signal transmission to the UEs and a larger number of narrow service beams for data transmission to the UEs. Each UE is first associated with a particular coarse beam based on measurements of the signal strength of the plurality of coarse beams received from the UE. Each UE is then associated with a narrow service beam based on reference signal measurements associated with a subset of service beams, which are associated with the particular coarse beam, from the UE.

FIG. 1A is a block diagram illustrating an example base station 100 in which the techniques for beam management described herein can be implemented. In the particular example shown in FIG. 1A, the base station 100 includes one or more baseband unit (BBU) entities 102 communicatively coupled to a RU 106 via a fronthaul network 104. The base station 100 provides wireless service to various items of user equipment (UEs) 108 in a cell 110. Each BBU entity 102 can also be referred to simply as a “BBU.”

In the example shown in FIG. 1A, the one or more BBU entities 102 comprise one or more central units (CU) 103 and one or more distributed units (DU) 105. Each CU 103 implements Layer 3 and non-time critical Layer 2 functions for the associated base station 100. Each DU 105 is configured to implement the time critical Layer 2 functions and at least some of the Layer 1 (also referred to as the Physical Layer) functions for the associated base station 100. Each CU 103 can be further partitioned into one or more control-plane and user-plane entities 107, 109 that handle the control-plane and user-plane processing of the CU 103, respectively. Each such control-plane CU entity 107 is also referred to as a “CU-CP” 107, and each such user-plane CU entity 109 is also referred to as a “CU-UP” 109.

The RU 106 is configured to implement the control-plane and user-plane Layer-1 functions not implemented by the DU 105 as well as the radio frequency (RF) functions. The RU 106 is typically located remotely from the one or more BBU entities 102. In the example shown in FIG. 1A, the RU 106 is implemented as a physical network function (PNF) and is deployed in or near a physical location where radio coverage is to be provided in the cell 110. In the example shown in FIG. 1A, the RU 106 is communicatively coupled to the DU 105 using a fronthaul network 104. In some examples, the fronthaul network 104 is a switched Ethernet fronthaul network (for example, a switched Ethernet network that supports the Internet Protocol (IP)).

The RU 106 includes or is coupled to a set of antennas 112 via which downlink RF signals are radiated to UEs 108 and via which uplink RF signals transmitted by UEs 108 are received. In some examples, the set of antennas 112 includes two or four antennas. However, it should be understood that the set of antennas 112 can include two or more antennas 112. In one configuration (used, for example, in indoor deployments), the RU 106 is co-located with its respective set of antennas 112 and is remotely located from the one or more BBU entities 102 serving it. In another configuration (used, for example, in outdoor deployments), the antennas 112 for the RU 106 are deployed in a sectorized configuration (for example, mounted at the top of a tower or mast). In such a sectorized configuration, the RU 106 need not be co-located with the respective sets of antennas 112 and, for example, can be located at the base of the tower or mast structure, for example, and, possibly, co-located with its serving one or more BBU entities 102.

While the example shown in FIG. 1A shows a single CU-CP 107, a single CU-UP 109, a single DU 105, and a single RU 106 for the base station 100, it should be understood that this is an example and other numbers of BBU entities, components of the BBU entities, and/or RUs can also be used.

Figure 1B:
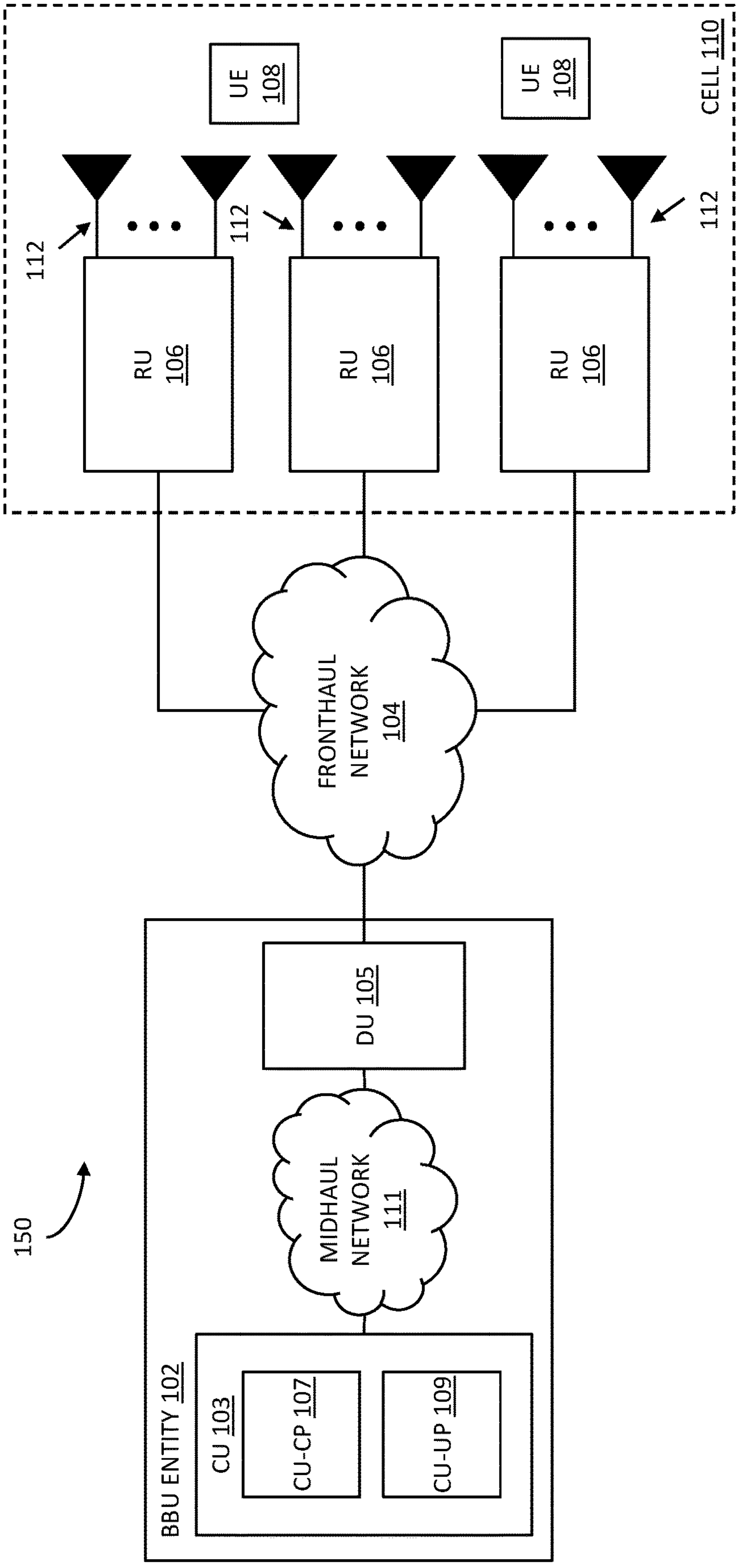

FIG. 1B is a block diagram illustrating an example base station 150 in which the techniques for beam management described herein can be implemented. In the particular example shown in FIG. 1B, the base station 150 includes one or more baseband unit (BBU) entities 102 communicatively coupled to multiple radio units (RU) 106 via a fronthaul network 104. The base station 150 provides wireless service to various items of user equipment (UEs) 108 in a cell 110. Each BBU entity 102 can also be referred to simply as a "BBU."

In the example shown in FIG. 1B, the one or more BBU entities 102 comprise one or more central units (CU) 103 and one or more distributed units (DU) 105. Each CU 103 implements Layer 3 and non-time critical Layer 2 functions for the associated base station 100. Each DU 105 is configured to implement the time critical Layer 2 functions and at least some of the Layer 1 (also referred to as the Physical Layer) functions for the associated base station 150. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RUs 106 are configured to implement the control-plane and user-plane Layer-1 functions not implemented by the DU 105 as well as the radio frequency (RF) functions. Each RU 106 is typically located remotely from the one or more BBU entities and located remotely from other RUs 106. In the example shown in FIG. 1B, each RU 106 is implemented as a physical network function (PNF) and is deployed in or near a physical location where radio coverage is to be provided in the cell 110. In the example shown in FIG. 1B, the RUs 106 are communicatively coupled to the DU 105 using a fronthaul network 104. In some examples, the fronthaul network 104 is a switched Ethernet fronthaul network (for example, a switched Ethernet network that supports the Internet Protocol (IP)).

Each of the RUs 106 includes or is coupled to a respective set of antennas 112 via which downlink RF signals are radiated to UEs 108 and via which uplink RF signals transmitted by UEs 108 are received. In some examples, each set of antennas 112 includes two or four antennas. However, it should be understood that each set of antennas 112 can include two or more antennas 112. In one configuration (used, for example, in indoor deployments), each RU 106 is co-located with its respective set of antennas 112 and is remotely located from the one or more BBU entities 102 serving it. In another configuration (used, for example, in outdoor deployments), the sets of antennas 112 for the RUs 106 are deployed in a sectorized configuration (for example, mounted at the top of a tower or mast). In such a sectorized configuration, the RUs 106 need not be co-located with the respective sets of antennas 112 and, for example, can be located at the base of the tower or mast structure, for example, and, possibly, co-located with the serving one or more BBU entities 102. Other configurations can be used.

The base stations 100, 150 that include the components shown in FIGS. 1A-1B can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. For example, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 102 (for example, the CU 103, CU-CP 107, CU-UP 109, and/or DU 105) are implemented as a software virtualized entities that are executed in a scalable cloud environment on a cloud worker node under the control of the cloud native software executing on that cloud worker node. In some such examples, the DU 105 is communicatively coupled to at least one CU-CP 107 and at least one CU-UP 109, which can also be implemented as software virtualized entities. In some other examples, one or more components of the one or more BBU entities 102 (for example, the CU-CP 107, CU-UP 109, and/or DU 105) are implemented as a single virtualized entity executing on a single cloud worker node. In some examples, the at least one CU-CP 107 and the at least one CU-UP 109 can each be implemented as a single virtualized entity executing on the same cloud worker node or as a single virtualized entity executing on a different cloud worker node. However, it is to be understood that different configurations and examples can be implemented in other ways. For example, the CU 103 can be implemented using multiple CU-UP VNFs and using multiple virtualized entities executing on one or more cloud worker nodes. Moreover, it is to be understood that the CU 103 and DU 105 can be implemented in the same cloud (for example, together in a radio cloud or in an edge cloud). In some examples, the DU 105 is configured to be coupled to the CU-CP 107 and CU-UP 109 over a midhaul network 111 (for example, a network that supports the Internet Protocol (IP)). Other configurations and examples can be implemented in other ways.

Further, it is to be understood that 5G NR embodiments can be used in both standalone and non-standalone modes (or other modes developed in the future) and the following description is not intended to be limited to any particular mode. Also, unless explicitly indicated to the contrary, references to "layers" or a "layer" (for example, Layer 1, Layer 2, Layer 3, the Physical Layer, the MAC Layer, etc.) set forth herein refer to layers of the wireless interface (for example, 5G NR) used for wireless communication between a base station and user equipment.

In some examples, the DU 105 is configured to transmit the SSB/PBCH from all of the RUs 106 in the cell 110 using an identical beam cycle for each RU 106. When a single PCI configuration is enabled for the base station 100, 150, the DU 105 is configured to maintain an association between each UE 108 and a particular RU 106 in addition to the coarse beam and fine beam associations discussed below. The DU 105 is configured to decode the PRACH signal from each RU 106 separately and create an initial association between the UE 108 and an RU 106 based on the initial PRACH detection. While unlikely, in some situations, multiple RUs 106 can decode the same RACH preamble. In such situations, the DU 105 is configured to associate the UE 108 with the RU 106 that received the RACH preamble with the highest signal quality.

In some examples, the DU 105 is configured to transmit PDSCH and Physical Downlink Control Channel (PDCCH) data to a UE 108 from all of the RUs 106 under that particular DU 105. In other examples, the DU 105 is configured to transmit PDSCH and PDCCH data to a UE 108 using less than all of the RUs 106 under that particular DU 105. In such examples, the DU 105 requests for, and decodes, Physical Uplink Shared Channel (PUSCH) and Physical Uplink Control Channel (PUCCH) data from a UE 108 only from its associated RU 106.

In some such examples, the DU 105 is configured to support frequency reuse for transmission to UEs 108. "Downlink frequency reuse" refers to situations where separate downlink user data intended for different UEs is simultaneously wirelessly transmitted to the UEs 108 using the same physical resource blocks (PRBs) for the same cell. "Uplink frequency reuse" refers to situations where separate uplink user data from different UEs 108 is simultaneously wirelessly transmitted from the UEs 108 using the same PRBs for the same cell 110. Such reuse UEs 108 are also referred to here as being "in reuse" with each other.

Typically, frequency reuse is implemented where the UEs 108 in reuse are sufficiently physically separated from each other so that the co-channel interference resulting from the different wireless transmissions is sufficiently low (that is, where there is sufficient RF isolation). However, the simultaneous service can result in mutual "reuse" interference among the UEs in reuse with each other, which degrades a UE's signal-to-interference-plus-noise ratio (SINR) and data rates compared to values achievable were the PRBs the UE was allocated not used for the other UEs. The reuse interference in a particular sector is the consequence of significant gains for the antenna patterns of the other sectors in the azimuth/elevation region covered by the particular sector (referred to as "leakage" among the sectors). The leakage among the sectors limits the capacity gain achievable with reuse among the sectors in the system.

Transmission Configuration Indication (TCI)-state associations are provided to the UE 108 in order to indicate which reference channel can be used to compute the receiver/transmitter beamformer for specific channels. The TCI-state associations can be to a specific coarse beam, a specific reference signal, or a different Physical Layer channel (for example, SRS).

In some examples, the UE 108 is provided the TCI-state selection for the PDCCH through MAC-CE based activation. The TCI-state association will be to the coarse beam regardless of whether the actual PDCCH transmission is from the coarse beam or a fine beam. The TCI-state association for PDSCH is based on the PDCCH association. In some examples, the UE 108 is also provided the TCI-state selection for PUCCH through MAC-CE based activation. The TCI-state association will be to the coarse beam regardless of whether the PUCCH reception at the RU 106 is performed using a coarse beam or a fine beam.

In some examples, the UE 108 is serviced using coarse beams on the downlink for PDCCH and PDSCH and using coarse beams on the uplink for PUCCH and PUSCH during the stage when the UE 108 has just entered a particular coarse beam and prior to the DU 105 receiving any CSI-report for the fine beams associated with the particular coarse beam. This scenario includes both the initial stage of, for example, an E-UTRAN New Radio-Dual Connectivity (EN-DC) call when the UE 108 has just entered a FR2 cell and the mobility stage when the UE 108 has just moved into the coverage of a new coarse beam.

In some examples, the UE 108 is configured to provide a full CSI-report for the current fine beam that includes Wideband Channel Quality Index (CQI), Precoding Matrix Indicator (PMI), and Rank Indicator (RI) from the Primary and Secondary Cells (PSCell) carrier. In some examples, the full CSI-report for the current fine beam further includes Wideband CQI and RI for the remaining Secondary Cell (Scell) carriers.

In some examples, each UE 108 is assigned PUCCH Format 2 resources for CSI reporting purposes at a certain periodicity (for example, 20 msec). Using these resources, each UE 108 is configured to send alternating reports for the CSI reporting where each type of report is repeated at a certain periodicity (for example, 40 msec). In some examples, the first report includes the coarse beam Layer 1-Reference Signal Received Power (L1-RSRP), the configured fine beam reference signal L1-RSRP, and a scheduling request. In such examples, the second report includes the full CSI-report for the current fine beam and a scheduling request.

As discussed above, a single-level beam management approach has numerous disadvantages in terms of resource utilization, coverage, performance, and/or cost. In order to overcome these disadvantages, the base stations 100, 150 utilize two-level beam management. In some examples, the base stations 100, 150 utilize two-level beam management that involves a smaller number of coarse beams being used to communicate synchronization signals with UEs and a larger number of fine beams being used to communicate data signals with UEs. Each of the coarse beams is associated with multiple fines beams and each fine beam is associated with one or more coarse beams.

Figure 2:
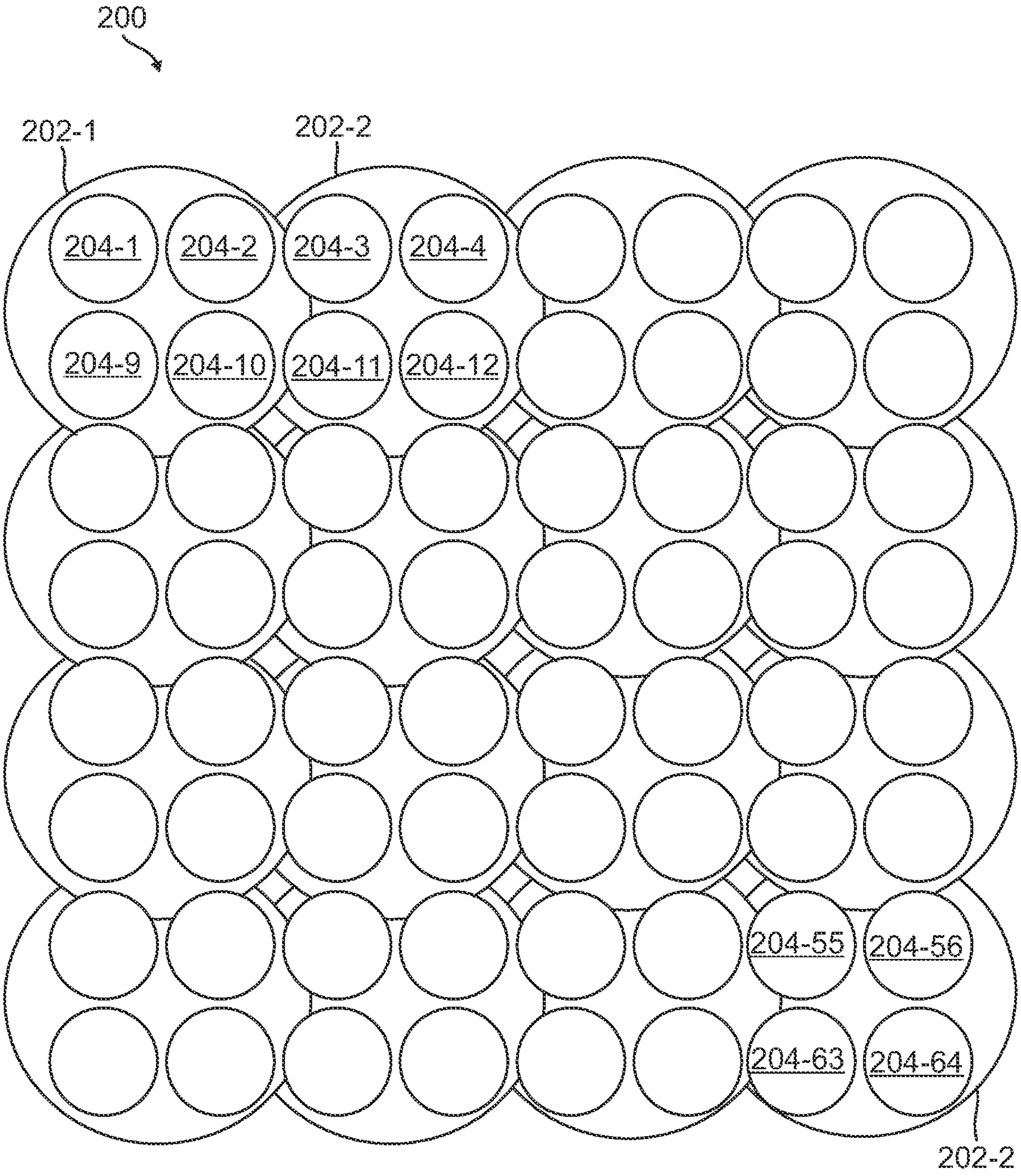
FIG. 2 is a diagram of an example antenna beam patterns for a radio unit.

FIG. 2 is a diagram of an example antenna beam pattern 200 for a radio unit 106. In the example shown in FIG. 2, the antenna beam pattern 200 includes both coarse beams 202 and fine beams 204. While a particular numbering scheme is shown in FIG. 2 that increases from left to right, it should be understood that this is an example and other numbering schemes could also be used for identifying the coarse beams 202 and/or the fine beams 204.

In the example shown in FIG. 2, the radio unit 106 is configured to utilize sixteen coarse beams 202 for synchronization signal transmission and sixty-four fine beams 204 for data signal transmission to UEs 108. In the example shown in FIG. 2, each coarse beam 202 has at least four fine beams 204 associated with it. For example, a first coarse beam 202-1 has the fine beams 204-1, 204-2, 204-9, 204-10 associated with it and a second coarse beam 202-2 has the fine beams 204-3, 204-4, 204-11, 204-12 associated with it. Depending on the amount of overlap between the first coarse beams 202-1 and a second coarse beam 202-2, the fine beams 204-2, 204-3, 204-10, 204-11 may be associated with both the first coarse beam 202-1 and the second coarse beam 202-2, for example.

In the example shown in FIG. 2, the number of coarse beams 202 used by the base station 100, 150 to communicate synchronization signals is sixteen, and the number of fine beams 204 used by the base station 100, 150 to communicate data signals is sixty-four. It should be understood that this is an example and a different number of coarse beams 202 and/or fine beams 204 could also be used.

In the example shown in FIG. 2, the sixteen coarse beams 202 are used to blanket the coverage area of the base station 100, 150 for synchronization signal transmission. In such examples, sixteen downlink slots are assigned to synchronization signals (for example, SSB) that repeat with a predetermined periodicity (for example, every 20 ms). Similarly, sixteen uplink PRACH occasions are reserved.

In the example shown in FIG. 2, the sixty-four fine beams 204 are used to blanket the coverage area of the base station 100, 150 for data signal transmission. Each fine beam 204 is associated with a beam-specific reference signal (for example, CSI-RS), which is used for making fine beam associations for a UE 108. In some examples, the reference signal transmission for each fine beam 204 is periodic (for example, every 20 msec) and uses one downlink OFDM symbol. In some examples, the beam-specific reference signal is set up as a 1-port signal, and only RSRP information is required for the UE 108.

In addition to the reference signal for each fine beam 204, each connected UE 108 is also assigned a dedicated, UE-specific reference signal (for example, a dedicated, UE-specific CSI-RS). In some examples, the UE-specific reference signal is set up as a 2-port signal, and the UE is configured to measure and report CQI/PMI/RI using the UE-specific reference signal.

Using the techniques described herein, each UE 108 is associated with two levels of beams (for example, a coarse beam 202 and a fine beam 204). In some examples, each UE 108 is associated with a coarse beam and a fine beam using a coarse beam identifier and a fine beam identifier, respectively.

Figure 3:
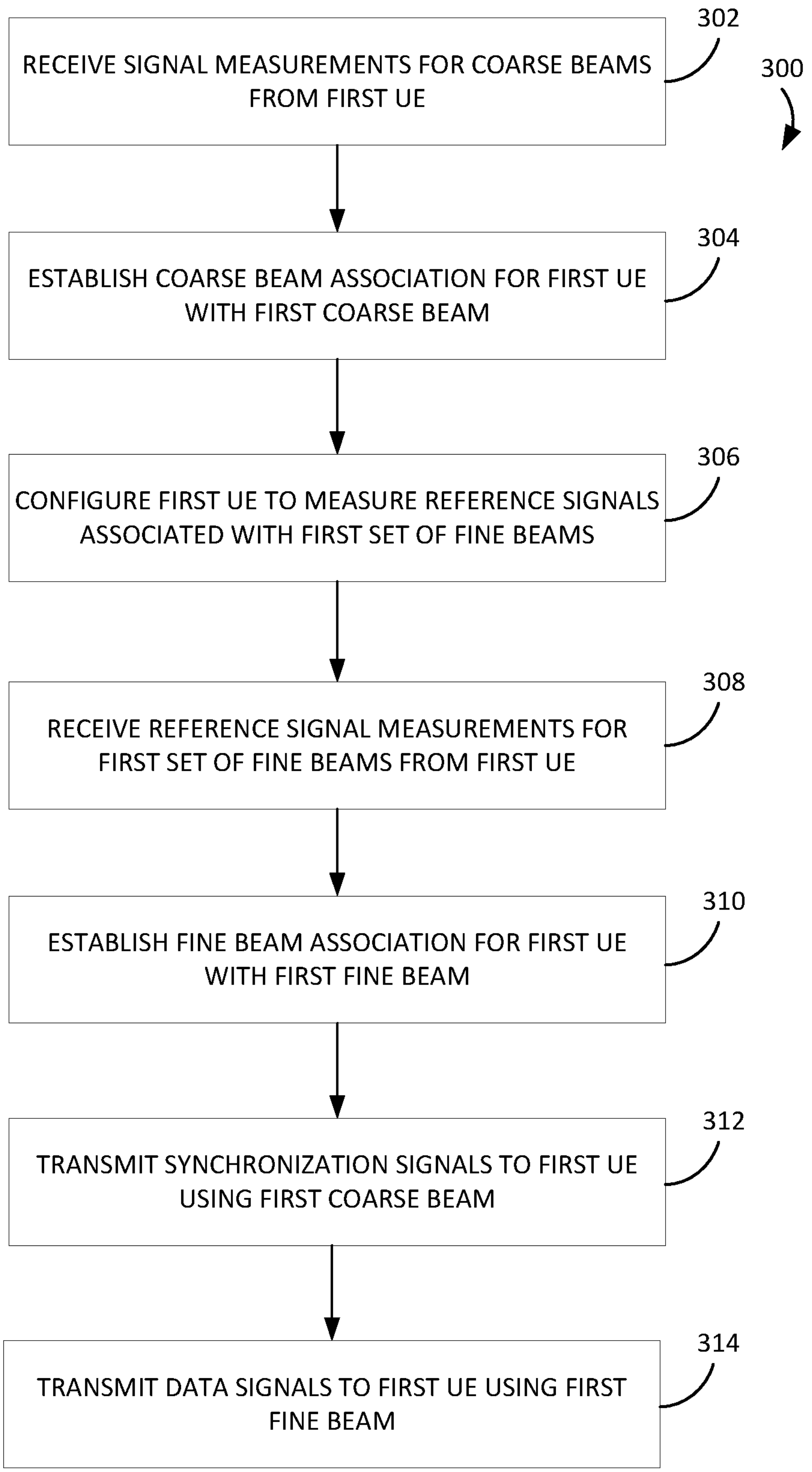
FIG. 3 is a flow diagram of an example method for two-level beam management.

FIG. 3 is a flow diagram of an example method 300 for two-level beam management. The common features discussed above with respect to FIGS. 1A-2 can include similar characteristics to those discussed with respect to method 300 and vice versa. In some examples, the method 300 is performed by a base station (for example, base station 100, 150).

The method 300 includes receiving signal measurements for a plurality of coarse beams from a first UE (block 302). In some examples, the first UE is configured to measure a received signal strength for synchronization signals for all coarse beams sent by the base station. In some such examples, the measurements by the UE are L1-RSRP measurements for SSB signals for all coarse beams. In some examples, the UE is configured to report the highest received signal strength for N (for example, four) coarse beams periodically (for example, every 20 msec). Other values of N can also be configured depending on desired operator settings. In some examples, the UE is configured to periodically measure the coarse beam based L1-RSRP measurements for all of the coarse beams, which are used for coarse beam tracking, and report the highest received signal strength for N coarse beams periodically.

The method further establishing a coarse beam association for a UE with a first coarse beam (block 304). In some examples, the coarse beam association between the first coarse beam and the UE is established based on the signal measurements for the coarse beams received from the UE at the base station. In some examples, the first coarse beam that is selected for association with the UE has the highest received signal strength reported by the UE.

Following the coarse beam association, method 300 includes configuring the UE to measure reference signals associated with a first set of fine beams (block 306) and receiving reference signal measurements for the first set of fine beams from the UE (block 308). The first set of fine beams is associated with the first coarse beam selected for the coarse beam association, and each fine beam is associated with a respective reference signal (for example, a respective CSI-RS).

In some examples, the base station configures the UE to measure reference signals associated with the first set of fine beams using an RRC Reconfiguration. In some such examples, the reference signal measurements by the UE are L1-RSRP measurements of a CSI-RS for each of the fine beams in the first set of fine beams. In some examples, the UE is configured to report the received signal strength for the reference signals associated with the first set of fine beams periodically (for example, every 20 msec). In some examples, the UE is configured to periodically measure the fine beam based L1-RSRP measurements for the first set of fine beams, which are used for fine beam tracking, and report the measurements periodically.

The method 300 further includes establishing a fine beam association for the UE with a first fine beam (block 310). In some examples, the fine beam association is established based on reference signal measurements taken at the UE that are provided to the base station. In some examples, the first fine beam that is associated with the UE has the highest received signal strength reported by the UE.

The method 300 further includes transmitting synchronization signals to the first UE using the first coarse beam (block 312) and transmitting data signals to the first UE using the first fine beam (block 314).

Figure 4A:
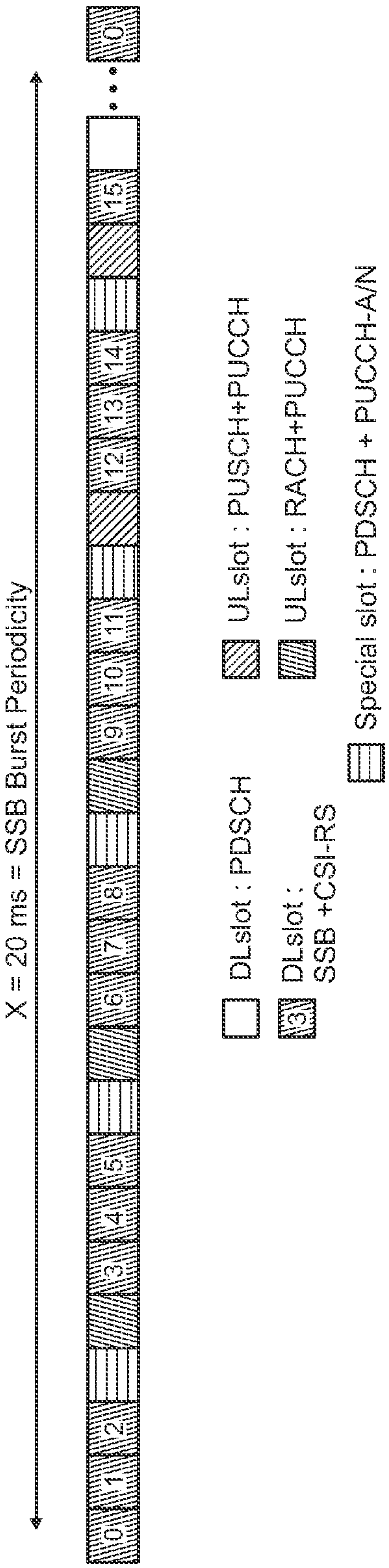
FIG. 4A is a diagram of an example slot allocation for a TDD configuration.

FIG. 4A is a diagram of an example slot allocation for a TDD configuration of the base station 100, 150. In the example shown in FIG. 4A, the base station 100, 150 is configured to implement a DDDSU TDD configuration where three downlink slots are followed by a special slot and an uplink slot.

In the example shown in FIG. 4A, some downlink slots (shown in green with numbers) are configured to include synchronization signals (shown as SSB) and reference signals (shown as CSI-RS) resources used by the UE for measurement and reporting for each of the coarse beams and associated fine beams. The downlink slots not configured to include synchronization signals and reference signals (shown in white) are configured to include PDSCH data resources. The special slots (shown in dark purple) are configured to include PDSCH data and PUCCH Ack/Nack resources. In the example shown in FIG. 4A, some uplink slots (shown in violet) are configured to include RACH and PUCCH resources. The uplink slots not configured to include RACH and PUCCH resources (shown in blue) are configured to include PUSCH and PUCCH resources.

Figure 4B:
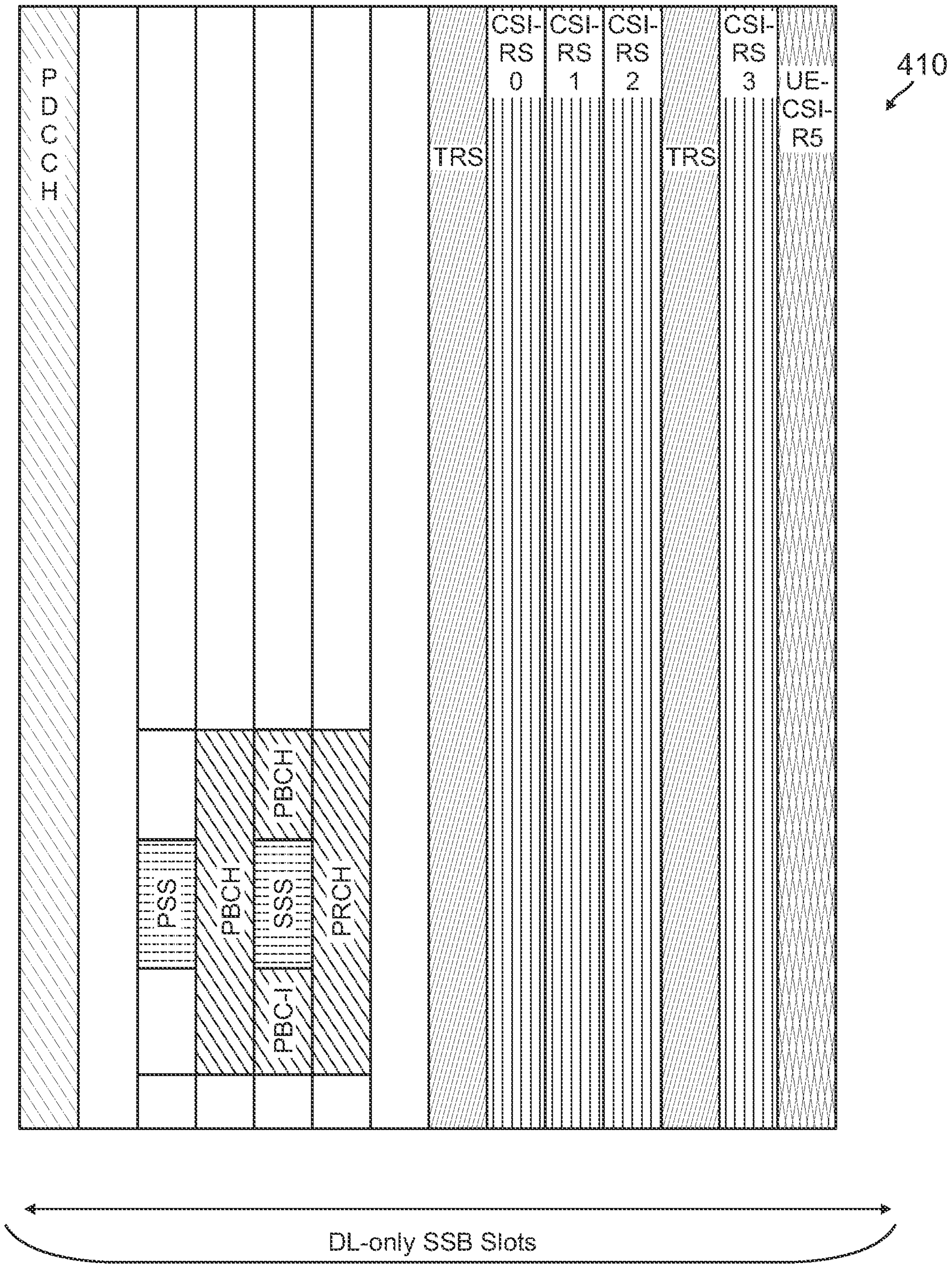
FIG. 4B is a diagram of an example symbol allocation for a downlink slot in the TDD configuration.

FIG. 4B is a diagram of an example symbol allocation for a first type of downlink slot 410 in the TDD configuration of the base station 100, 150, which is also referred to herein as an SSB slot 410. In the example shown in FIG. 4B, the SSB slot 410 is configured to include symbols assigned for synchronization signals (SSB including PSS, PBCH, and SSS) that are transmitted with a particular coarse beam. The SSB slot 410 is further configured to include symbols assigned for beam-specific reference signals (CSI-RS 0, CSI-RS 1, CSI-RS 2, CSI-RS 3) that are transmitted with the fine beams associated with the particular coarse beam. The SSB slot 410 is further configured to include a symbol assigned for a UE-specific reference signal (UE-CSI-RS).

The beam-specific reference signals and the UE-specific reference signal are assigned to symbols in the SSB slot 410 not assigned for synchronization signal transmission with the coarse beam or otherwise assigned or reserved for other purposes. For example, the first symbol of any downlink slot may need to be reserved for PDCCH transmission, and the symbols immediately preceding and after the SSB symbols may have to be avoided due to restrictions related to UE measurement. Thus, in the example shown in FIG. 4B, the first symbol in the SSB slot 410 is reserved for PDCCH transmissions, and the symbols immediately before and after the SSB symbols are reserved. In some examples, PDSCH is not scheduled in the SSB slot 410, so PDCCH for the uplink can occur in the SSB slot 410 but not PDCCH for the downlink. In some examples, any remaining beam-specific reference signals that cannot be accommodated within the SSB slots 410 will be assigned to symbols in non-SSB slot(s). In some such examples, the remaining beam-specific reference signals are assigned symbols in a minimum possible number of non-SSB downlink slots.

Each respective downlink slot of this type in the sequence shown in FIG. 4A will correspond to respective synchronizations signals transmitted with a respective coarse beam and beam-specific reference signals transmitted with the fine beams associated with that respective coarse beam. In the example shown in FIG. 4B, the downlink slot 410 corresponds to the first downlink slot in the sequence in FIG. 4A, which is labeled downlink slot 0 in FIG. 4A. In the context of the antenna beam pattern shown in FIG. 2, the downlink slot 410 can correspond to the first coarse beam 202-1 and the fine beams 204-1, 204-2, 204-9, 204-10.

Figure 4C:
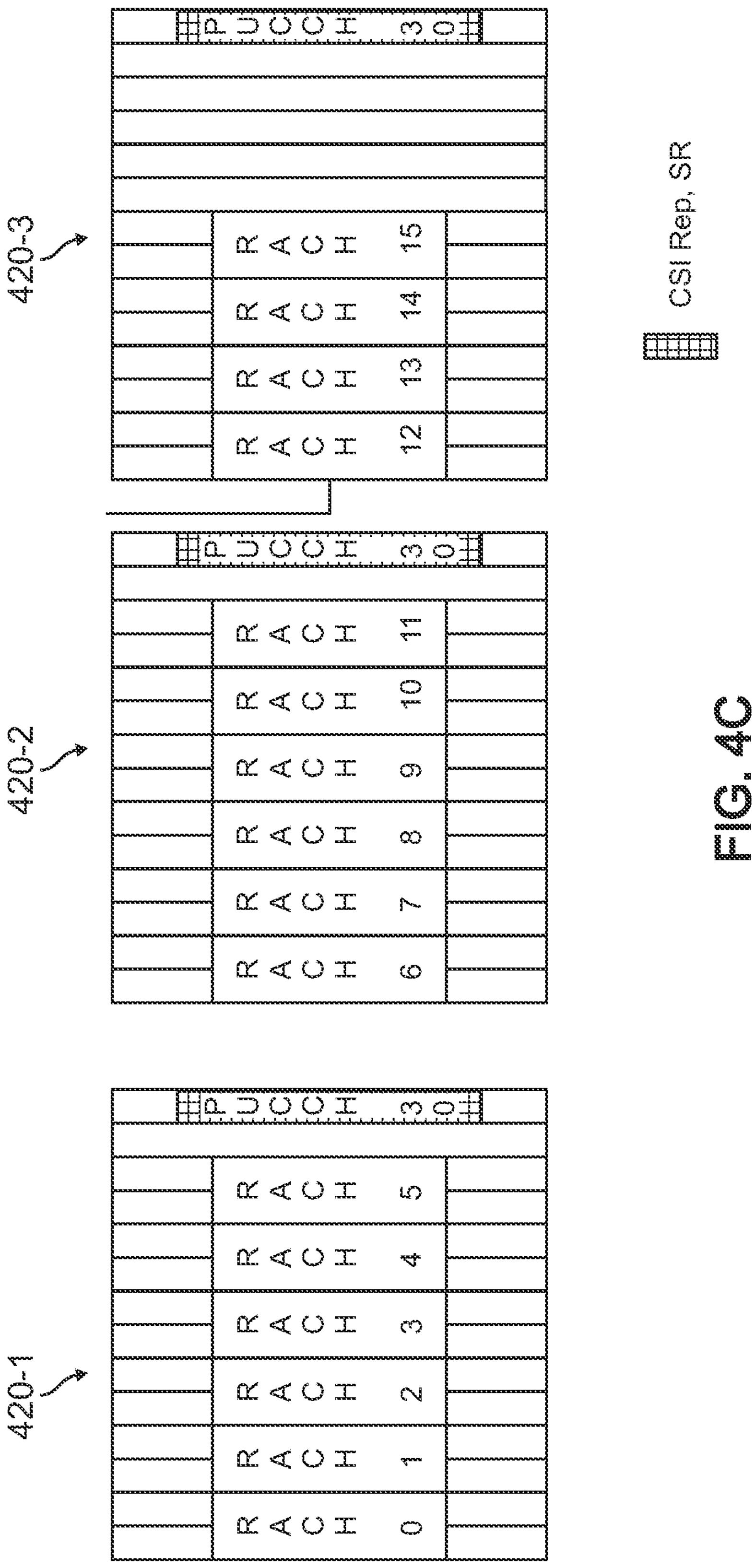
FIG. 4C is a diagram of example symbol allocations for multiple uplink slots in the TDD configuration.

FIG. 4C is a diagram of example symbol allocation for a first type of uplink slot 420 in the TDD configuration of the base station 100, 150. In the example shown in FIG. 4C, the first uplink slot 420-1 is configured to include symbols assigned for RACH associated with different synchronization signals transmitted with a particular coarse beam. In the example shown in FIG. 4C, the first uplink slot 420-1 is configured to include symbols assigned for RACH associated with synchronization signals transmitted using the first six coarse beams, the second uplink slot 420-2 is configured to include symbols assigned for RACH associated with synchronization signals transmitted using the next six coarse beams, and the third uplink slot 420-3 is configured to include symbols assigned for RACH associated with synchronization signals transmitted using the final four coarse beams.

In the example shown in FIG. 4C, the first uplink slot 420-1, the second uplink slot 420-2, and the third uplink slot 420-3 are each configured to include dedicated PUCCH resources in the last symbol of the slot. The dedicated PUCCH resources are provided to UEs for CSI reporting and scheduling requests. In some examples, each UE serviced by the base station is allocated PUCCH resources that repeat with a predetermined periodicity (for example, 20 msec).

Figure 4D:
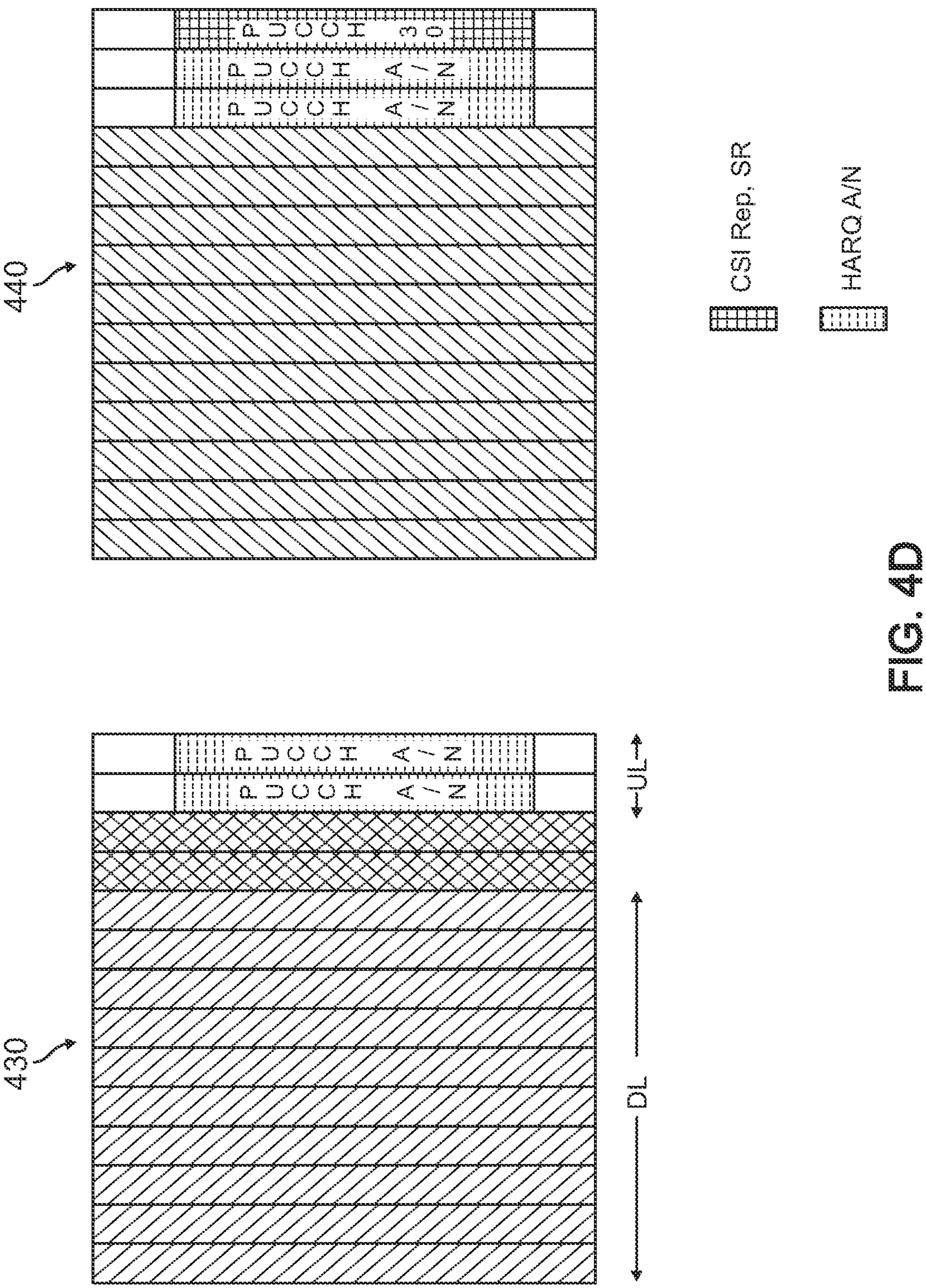
FIG. 4D is a diagram of example symbol allocations for a special slot and an uplink slot in the TDD configuration.

FIG. 4D is a diagram of example symbol allocations for a special slot 430 and a second type of uplink slot 440 in the TDD configuration of the base station 100, 150. In the example shown in FIG. 4D, the special slot 430 is configured to include ten symbols assigned for downlink data (symbols 1-10), two guard symbols (symbols 11 and 12), and two uplink symbols (symbols 13-14). In the example shown in FIG. 4D, the uplink symbols (symbols 13-14) of the special slot 430 are assigned to PUCCH resources for HARQ Ack/Nack. In some examples, the special slot 430 is not used for SSB/CSI-RS/TRS purposes.

In the example shown in FIG. 4D, the second type of uplink slot 440 is configured to include dedicated PUCCH resources in the last symbol of the slot. The dedicated PUCCH resources are provided to UEs for CSI reporting and scheduling requests. In the example shown in FIG. 4D, the uplink slot 440 is configured to include symbols assigned to PUCCH resources for HARQ Ack/Nack. The remaining symbols in the uplink slot 440 are assigned for PUSCH data. In some examples, the PUCCH resource selection by the DU 105 is performed in a manner that maximizes the number of symbols available for PUSCH. For example, the DU 105 is configured to allocate symbols for PUCCH starting with symbol 14 of the uplink slot 440 and moving inwards as necessary.

Figure 4E:
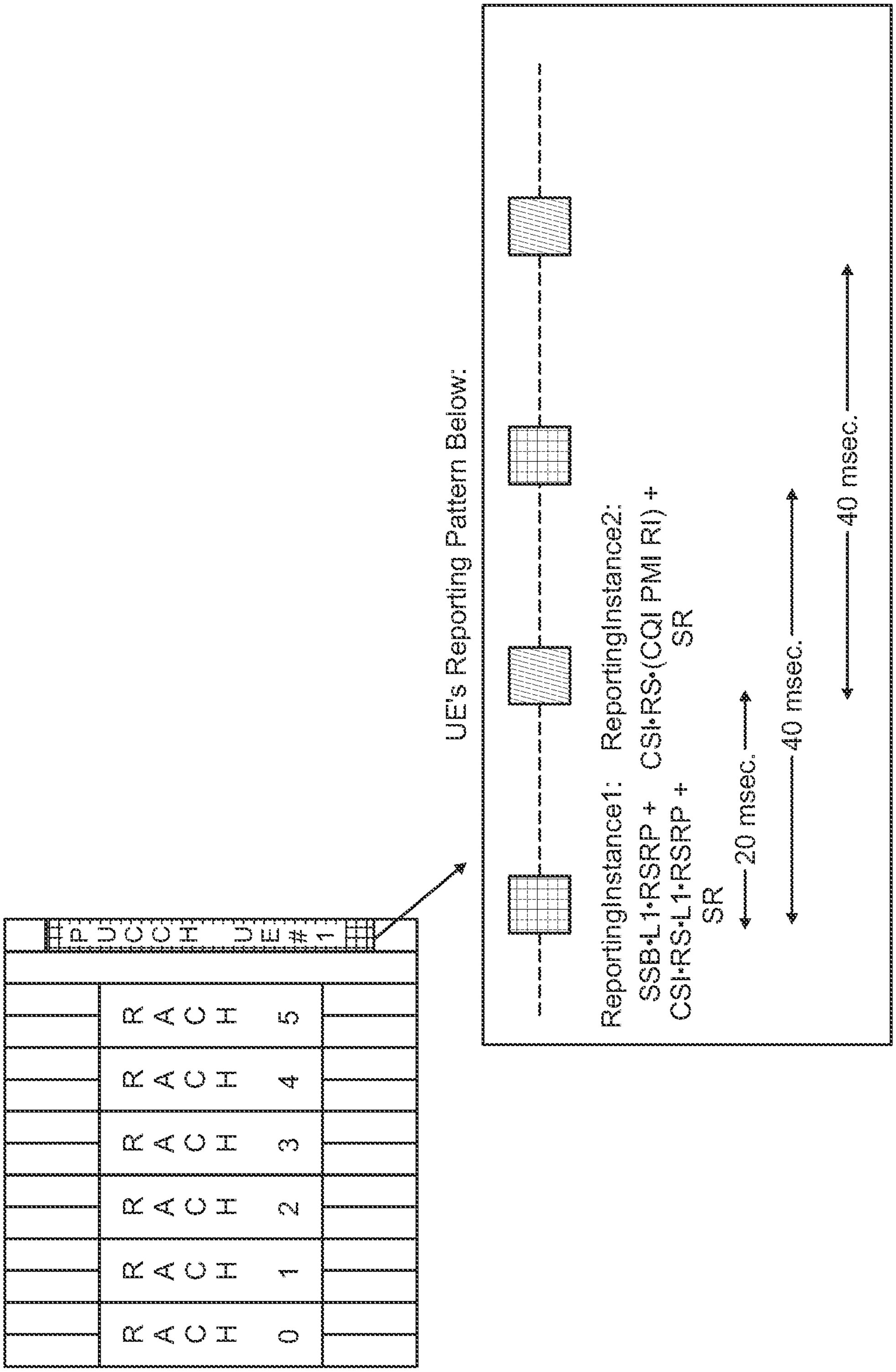
FIG. 4E is a diagram of an example reporting pattern for a user equipment using the uplink slots in the TDD configuration.

As discussed above, the last symbol in the uplink slots 420, 440 is assigned to dedicated PUCCH resources, which are used by UEs to transmit CSI reports and scheduling requests. FIG. 4E is a diagram of an example reporting pattern for a UE using the uplink slots in the TDD configuration of the base station 100, 150. While the uplink slot shown in FIG. 4E corresponds to the first type of uplink slot 420, it should be understood that the reporting pattern for some UEs 108 would be implemented using the second type of uplink slot 440 shown in FIG. 4D as well.

In some examples, the DU 105 is configured to provide a distinct symbol location (of the dedicated PUCCH resources) for each UE 108 being serviced by the base station 100, 150. In the example shown in FIG. 4E, for each UE 108, the PUCCH resources will occur with a periodicity of 20 msec, but the UE will alternate between two reporting instances. Therefore, each type of reporting instance will be repeated every 40 msec in this example. In example shown in FIG. 4E, the UE 108 is configured to alternate between a first report instance (Report Instance 1) and a second report instances (Report Instance 2). In the example shown in FIG. 4E, the first report instance includes the coarse beam L1-RSRP (shown as SSB L1 RSRP), the configured fine beam reference signal (shown as CSI RS L1 RSRP), and a scheduling request (shown as SR). In the example shown in FIG. 4, the second report instance includes the full CSI-report for the current fine beam (shown as CSI RS (CQI/PMI/RI) and a scheduling request (shown as SR).

Figure 5:
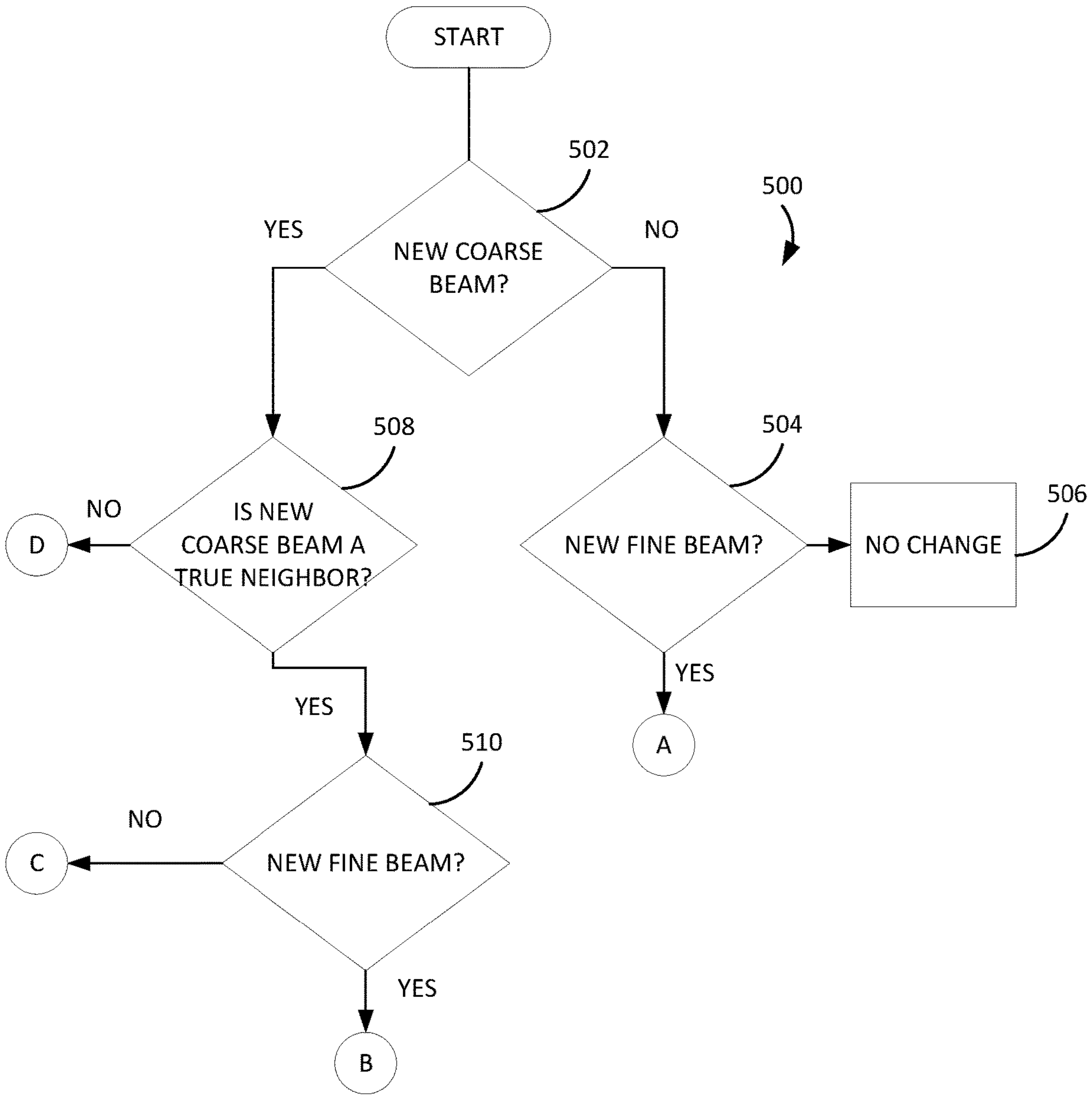
FIG. 5 is a flow diagram of an example method for two-level beam management.

FIG. 5 is a flow diagram of an example method 500 for two-level beam management. The common features discussed above with respect to FIGS. 1A-4E can include similar characteristics to those discussed with respect to method 500 and vice versa. In some examples, the method 500 is performed by a base station (for example, base station 100, 150) after initial coarse and fine beam association have been made for a UE.

The method 500 begins with determining whether a new coarse beam is to be used for a UE (block 502). In some examples, determining whether a new coarse beam is to be used for the UE is based on an updated coarse beam L1-RSRP provided in the reports from the UE. In some examples, the coarse beam L1-RSRP is averaged over multiple reporting instances prior to a determination being made. In some examples, a new coarse beam is to be used when the received signal strength for the current coarse beam is less than a received signal strength for a different coarse beam by greater than a threshold amount. The threshold amount can be set based on the desired performance of the system, QoS requirements, or the like. In some examples, no threshold is used and a new coarse beam is to be used when the received signal strength for the current coarse beam is less than a received signal strength for a different coarse beam.

If a new coarse beam is not to be used, the method 500 proceeds with determining whether a new fine beam is to be used for the UE (block 504). In some examples, determining whether a new fine beam is to be used for the UE is based on updated reference signal measurements from the UE. For example, the determination can be made based on the CSI-RS L1-RSRP provided in the CSI reports from the UE. In some examples, the reference signal measurements from the UE are averaged over multiple reporting instances prior to a determination being made. In some examples, a new fine beam is to be used when the received signal strength for the reference signal associated with the current fine beam is less than a received signal strength for a reference signal associated with a different fine beam by greater than a threshold amount. The threshold amount can be set based on the desired performance of the system, QoS requirements, or the like. In some examples, no threshold is used and a new fine beam is to be used when the received signal strength for the current fine beam is less than a received signal strength for a different fine beam.

If a new fine beam is not to be used for the UE, the method 500 proceeds with making no change to the beams (block 506). If a new fine beam is to be used for the UE, the method 500 proceeds with the steps for a first type of beam change described below with respect to FIGS. 6-6B.

If a new coarse beam is to be used, the method 500 proceeds with determining whether the new coarse beam is a true neighbor of the current coarse beam (block 508). In some aspects, a true neighbor is a beam that the UE would naturally see if it were moving across the coverage area of an RU. For example, the true neighbor beam can be the next beam in the angular sense of all the possible directions around the current beam. In the example shown in FIG. 2, the second coarse beam 202-2 is a true neighbor of the first coarse beam 202-1. In an actual deployment, it is possible that a UE will see a new beam that is not a true neighbor due to the reflection and scattering environment in the deployment.

In other aspects, a true neighbor is a beam that the UE would naturally see from one RU to the next RU. The assumption for this scenario is that the RUs are placed in a row with identical orientation, which allows for the system design to assume a certain set of beams to be considered true neighbors of any of the edge beams of an RU. In the example shown in FIG. 2, a coarse beam of a different RU could be a true neighbor of the coarse beam 202-1 of the RU 106. However, in actual deployments, the UE in one of the edge beams of an RU will often move to the next RU and see a non-true neighbor beam. This can happen, for example, if the orientation of the neighbor RU is different or due to strong reflective paths in the deployment environment.

If the new coarse beam is a true neighbor of the current coarse beam, the method 500 proceeds with determining whether a new fine beam is to be used (block 510). In some examples, the determination for block 510 is the same as the determination for block 504.

If a new fine beam is also to be used for the UE, the method 500 proceeds with the steps for a second type of beam change described below with respect to FIGS. 7-7B. If a new fine is not also to be used for the UE, the method 500 proceeds with the steps for a third type of beam change described below with respect to FIG. 8.

If the new coarse beam is not a true neighbor of the current coarse beam, the method 500 proceeds with the steps for a fourth type of beam change described below with respect to FIGS. 9-9B.

Figure 6:
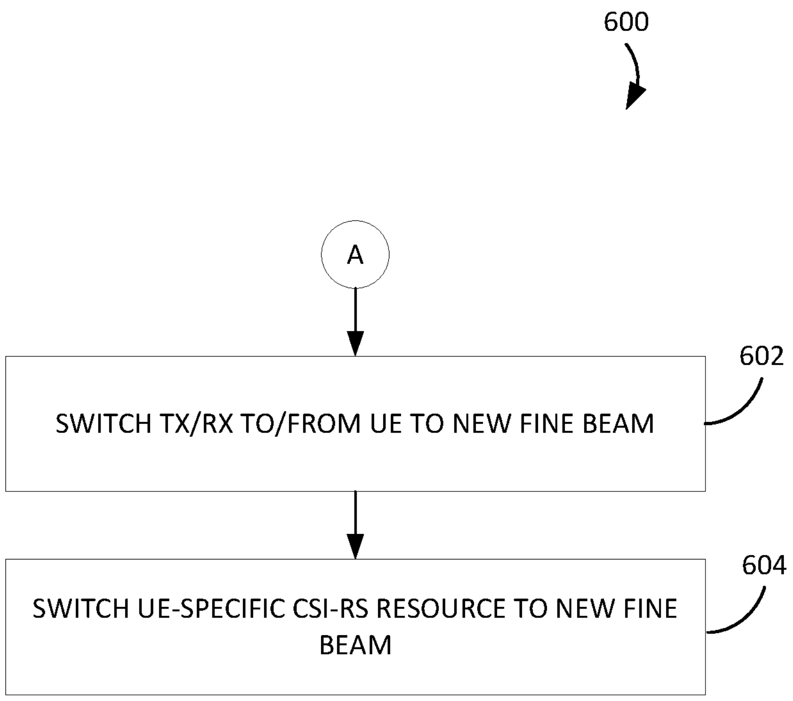
FIG. 6 is a flow diagram of an example method for a first type of beam change.

FIG. 6 is a flow diagram of an example method 600 for a first type of beam change. The common features discussed above with respect to FIGS. 1A-5 can include similar characteristics to those discussed with respect to method 600 and vice versa. In some examples, the method 600 is performed by a base station (for example, base station 100, 150).

The method 600 includes switching transmission/reception to/from the UE to a new fine beam (block 602). That is, the base station is configured to switch from the current fine beam to the new fine beam for further communications with the UE. In some examples, the new fine beam is associated with the same coarse beam as the current fine beam, so it is in the same set of fine beams for which the UE has provided reference signal measurements to the base station.

The method 600 further includes switching a UE-specific CSI-RS resource to the new fine beam (block 604). That is, the base station is configured to switch the UE-specific CSI-RS resource from being transmitted using the current fine beam to being transmitted using the new fine beam. In some examples, the UE-specific CSI-RS resource is provided to the UE in same downlink slot that includes synchronization signals for the coarse beam and the references signals for the fine beams as described above with respect to FIG. 4B.

Figure 6A:
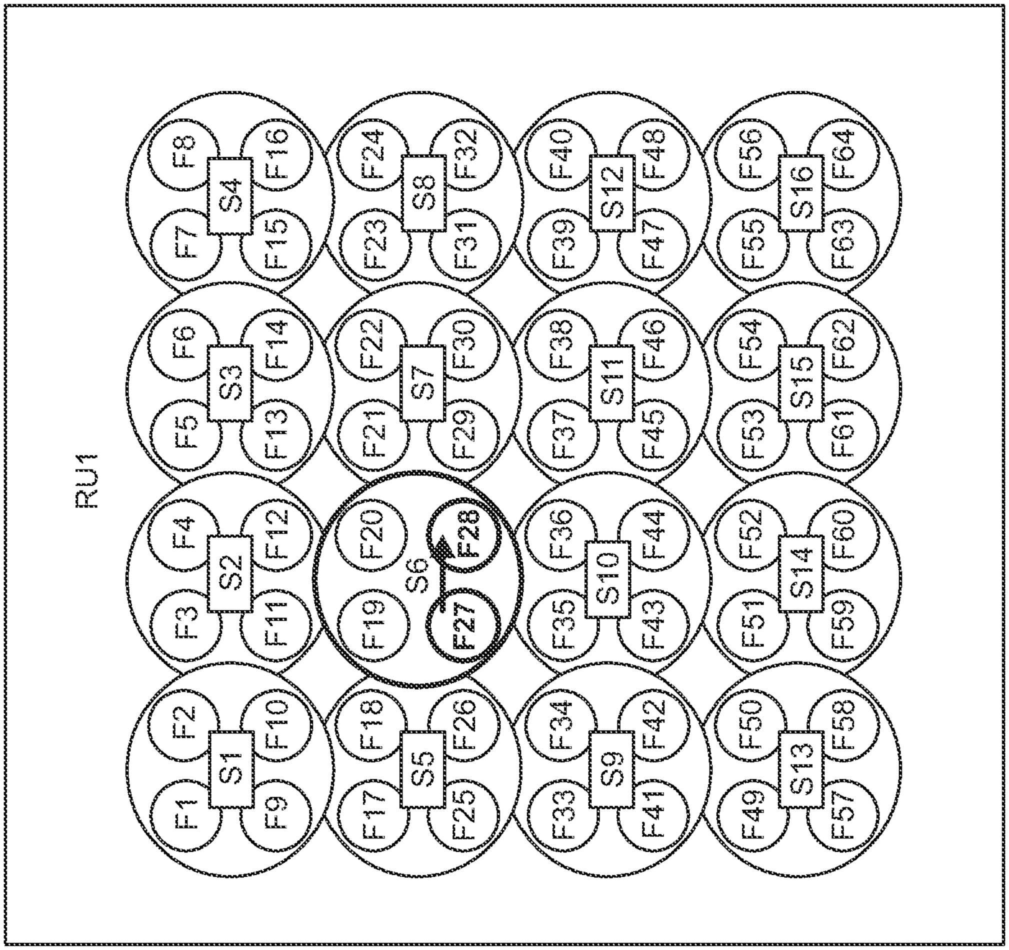
FIG. 6A is a diagram of the first type of beam change.
Figure 6B:
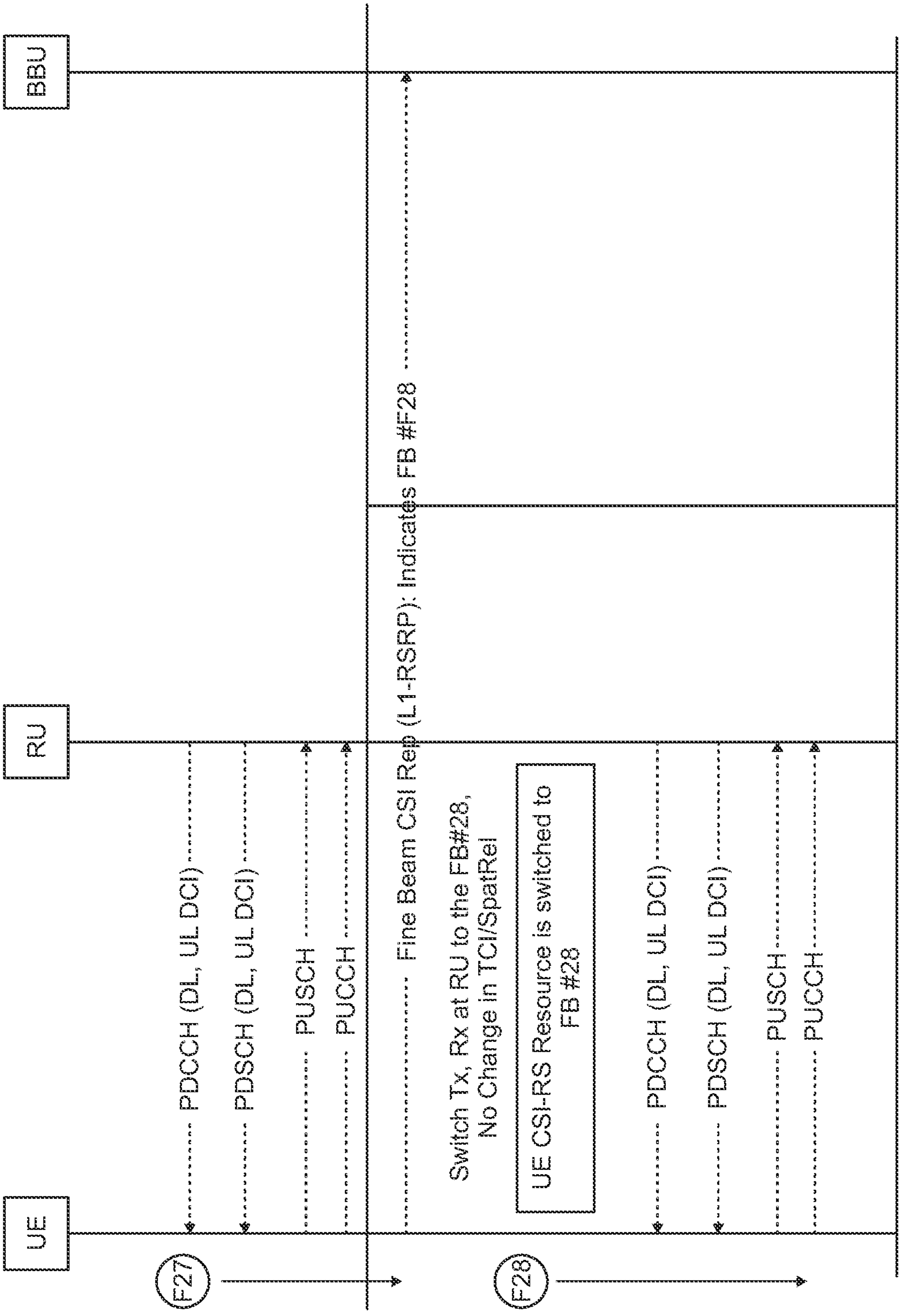
FIG. 6B is a sequence diagram for the example first beam change scenario.

FIG. 6A is a diagram showing a particular example of the first type of beam change scenario corresponding to method 600, and FIG. 6B is a sequence diagram showing the communications and sequence of operations for the particular example shown in FIG. 6A. In the example shown in FIG. 6A, the coarse beams are labeled S1, S2, etc. and the fine beams are labeled F1, F2, etc. In the example shown in FIGS. 6A-6B, the UE is currently associated with coarse beam S6 and fine beam F27 and using the fine beam F27 for communication between the UE and the RU. In the example shown in FIGS. 6A-6B, a determination is made that a new fine beam F28 is to be used based on the fine beam CSI report. In the example shown in FIG. 6A, the new fine beam F28 is in the set of fine beams associated with the coarse beam S6, so a new coarse beam is not to be used. As shown in FIG. 6B, the Tx and Rx at the RU with the UE is switched to the fine beam F28, and the UE CSI-RS resource is also switched to the fine beam F28. As noted in FIG. 6B, no changes in the TCI-state or spatial relations are signaled to the UE for the first type of beam change. Further, it should be noted that no Modulation and Coding Scheme (MCS) corrections are performed for the first type of beam change. Link adaptation proceeds as before, but with the new CQI/PMI/RI for the new fine beam taken into account when applicable.

Figure 7:
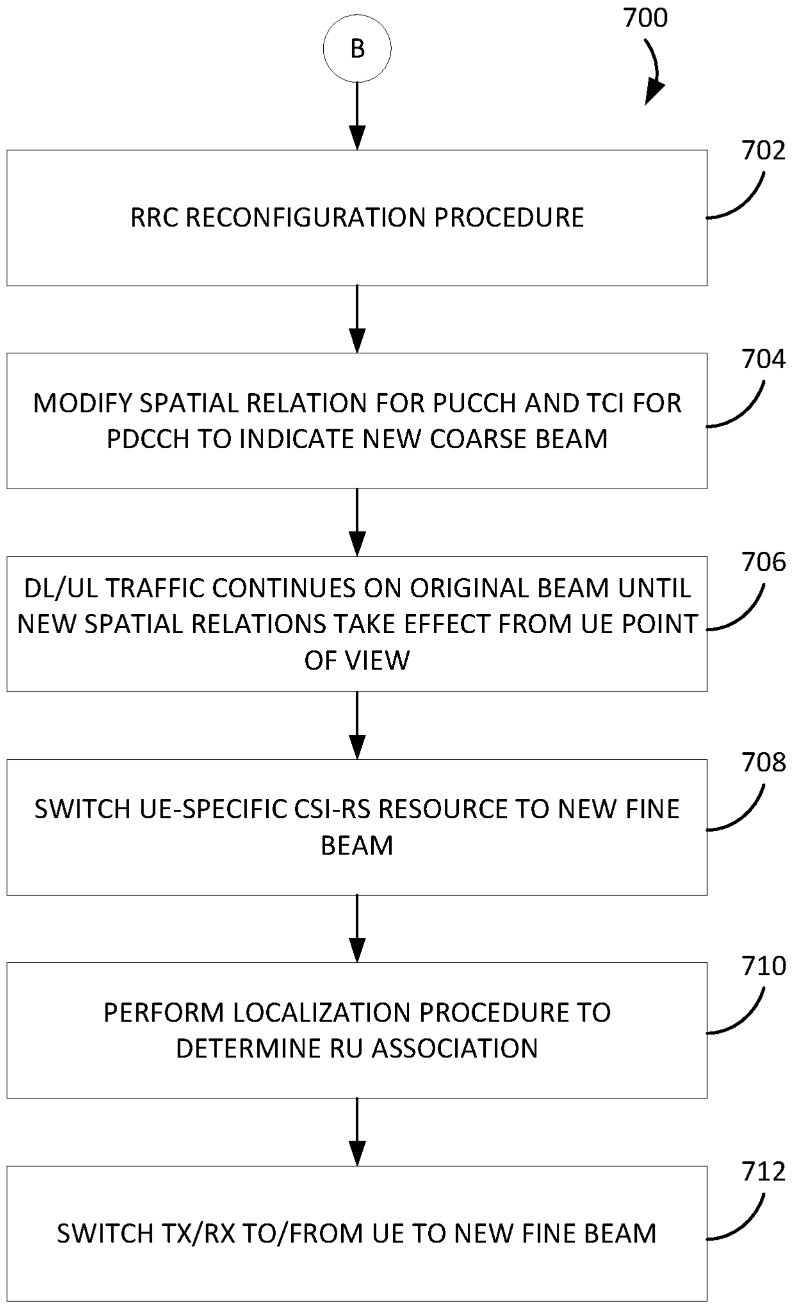
FIG. 7 is a flow diagram of an example method for a second type of beam change.

FIG. 7 is a flow diagram of an example method 700 for a second type of beam change. The common features discussed above with respect to the base stations in FIGS. 1A-5 can include similar characteristics to those discussed with respect to method 700 and vice versa. In some examples, the method 700 is performed by a base station (for example, base station 100, 150).

The method 700 begins with performing an RRC reconfiguration procedure (block 702). In some examples, the RRC reconfiguration procedure is performed in order to change the Spatial Relation Set for PDCCH and PUCCH. In some examples, the RRC reconfiguration procedure is performed in order to change the set of CSI-RS resources that UE is required to measure.

The method 700 further includes modifying a spatial relation for PUCCH and a TCI for PDCCH to indicate the new coarse beam (block 704). In some examples, the modifications are performed through MAC-CEs.

The method 700 further includes continuing downlink/uplink traffic on current beam until new spatial relations take effect from the UE point of view (block 706). In some examples, the new spatial relations take effect from the UE point of view within 3 msec after the MAC-CEs.

After the new spatial relation is valid, method 700 further includes switching a UE-specific CSI-RS resource to the new fine beam (block 708). That is, the base station is configured to switch the UE-specific CSI-RS resource from being transmitted using the current fine beam to being transmitted using the new fine beam. In some examples, the UE-specific CSI-RS resource is provided to the UE in same downlink slot that includes synchronization signals for the coarse beam and the references signals for the fine beams as described above with respect to FIG. 4B.

The method 700 further includes performing a localization procedure to determine a radio unit association (block 710). In some examples, the localization procedure includes the BBU (for example, the DU) scheduling a PUSCH transmission by the UE with a small allocation (for example 10 PRBs) as soon as possible. Where the UE does not have data, the PUSCH transmission can be gratuitous. In such examples, the transmission for the localization grant is made using the new coarse beam. During the localization procedure, no other downlink or uplink traffic is scheduled with the UE by the BBU. The corresponding localization transmission from the UE (for example, using PUSCH) is received and processed per the localization requirement and the determination of the RU association is made.

In some examples, the determination of the RU association is made based on IQ samples from all of the RUs, which are decoded separately at the BBU, and the reception is performed with the beam index corresponding to the new coarse beam. When data from a single RU is decoded with a CRC pass outcome (high likelihood), that single RU is determined to be the RU associated with the UE. When the data from more than one RU is decoded with a CRC pass outcome (low likelihood), the RU with the best received signal metric (for example, SINR) is determined to be the RU associated with the UE.

In examples where the new coarse beam corresponds to the same RU as the previous coarse beam, there is no change in the RU association. However, in examples where the new coarse beam corresponds to a different RU as the previous coarse beam, there would be a change in the RU association to the different RU.

In some examples, block 710 is performed immediately following block 704 and after a 3 msec gap to allow for the UE to perform the beam switch after receiving the relevant MAC-CE, and during the 3 msec gap, any PUCCH transmissions from the UE are received using the current RU and the current beam (not the new beam). Further, in some examples, during the time that block 710 is being performed, any PUCCH transmissions from the UE are received using the new coarse beam.

In other examples, such as the example shown in FIG. 1A with a single RU 106, block 708 may not be performed since it is not needed due to the UEs necessarily being associated with the single RU 106 included in the base station 100.

The method 700 further includes switching transmission/reception to/from the UE to the new fine beam (block 712). That is, the base station is configured to switch from the current fine beam to the new fine beam for further communications with the UE. In some examples, the new fine beam is associated with the same coarse beam as the current fine beam, so it is in the same set of fine beams for which the UE has provided reference signal measurements to the base station.

In some examples, the new coarse beam is already in the current TCI list of the UE. In such examples, blocks 704 can be performed in parallel to block 702.

Figure 7A:
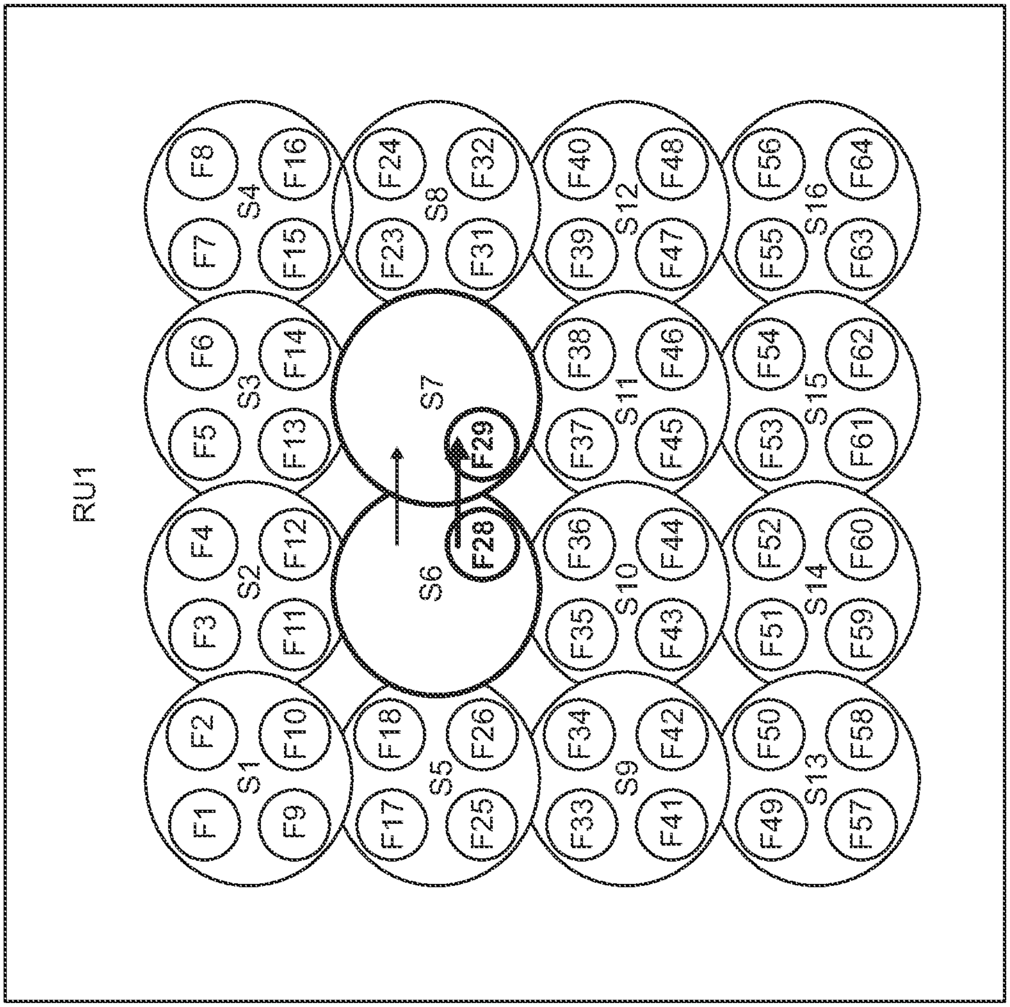
FIG. 7A is a diagram of the second type of beam change.
Figure 7B:
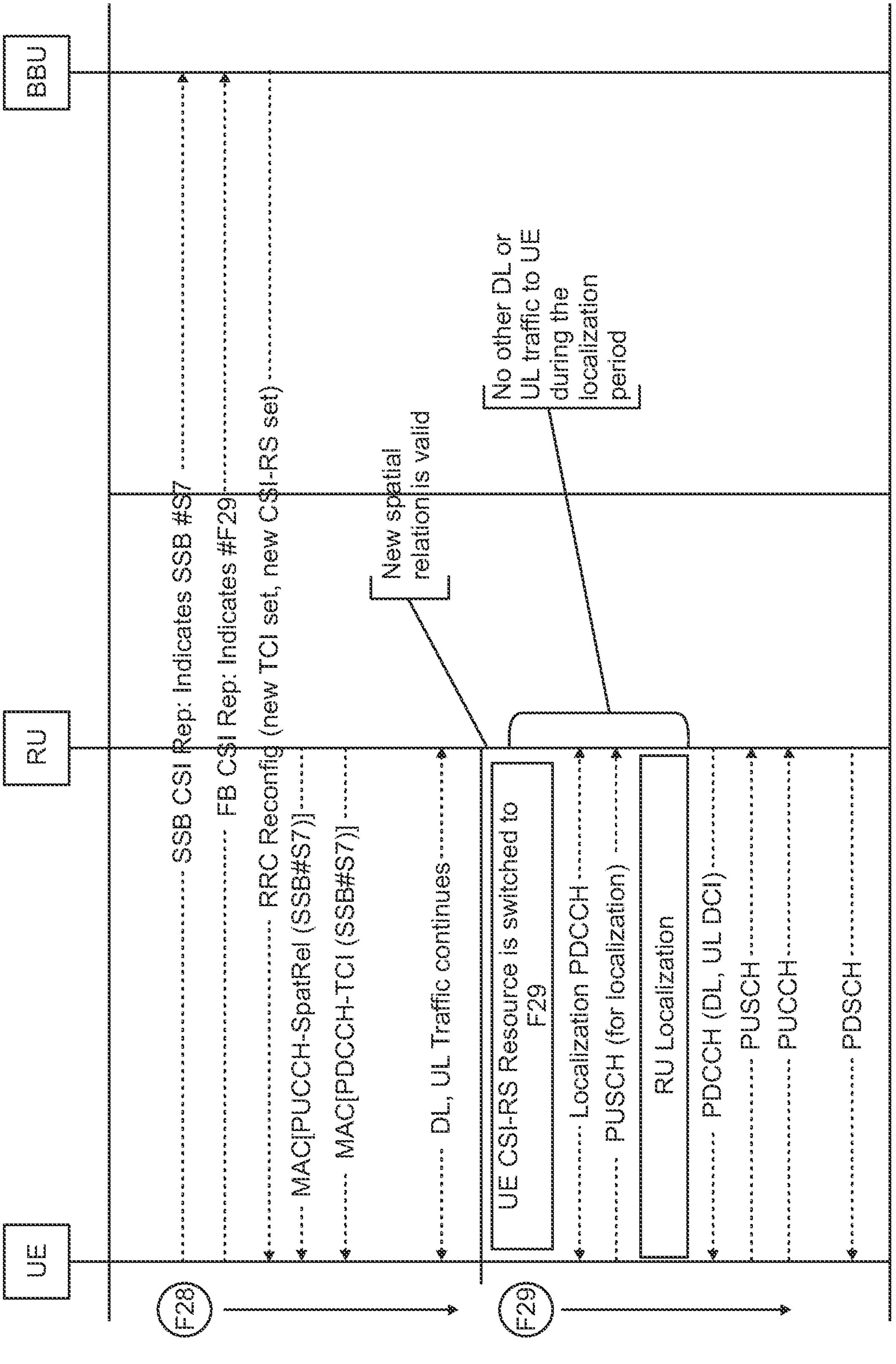
FIG. 7B is a sequence diagram for the second type of beam change.

FIG. 7A is a diagram showing a particular example of the second type of beam change scenario corresponding to method 700, and FIG. 7B is a sequence diagram showing the communications and sequence of operations for the particular example shown in FIG. 7A. In the example shown in FIG. 7A, the coarse beams are labeled S1, S2, etc. and the fine beams are labeled F1, F2, etc.

In the example shown in FIGS. 7A-7B, the UE is currently associated with coarse beam S6 and fine beam F28 and using the fine beam F28 for communication between the UE and the RU. In the example shown in FIGS. 7A-7B, a determination is made that a new coarse beam S7 is to be used based on the SSB CSI report, and a new fine beam F29 is to be used based on the fine beam CSI report. As shown in FIG. 7B, an RRC reconfiguration is performed, and the MAC-CEs are used to modify the spatial relation for PUCCH and the TCI for PDCCH to denote the new coarse beam S7. Until the new spatial relation is valid, downlink/uplink traffic continues using the current fine beam F28. After the new spatial relation is valid, the UE CSI-RS resource is switched to the new fine beam F29. In the example shown in FIG. 7B, a PUSCH transmission is scheduled for the UE and sent using the coarse beam S7, and the UE PUSCH transmission is received and processed for RU localization. As noted in FIG. 7B, no other downlink or uplink traffic is scheduled with the UE by the BBU during the localization period. Further, it should be noted that no MCS corrections are performed for the second type of beam change. Link adaptation proceeds as before, but with the new CQI/PMI/RI for the new fine beam taken into account when applicable.

Figure 8:
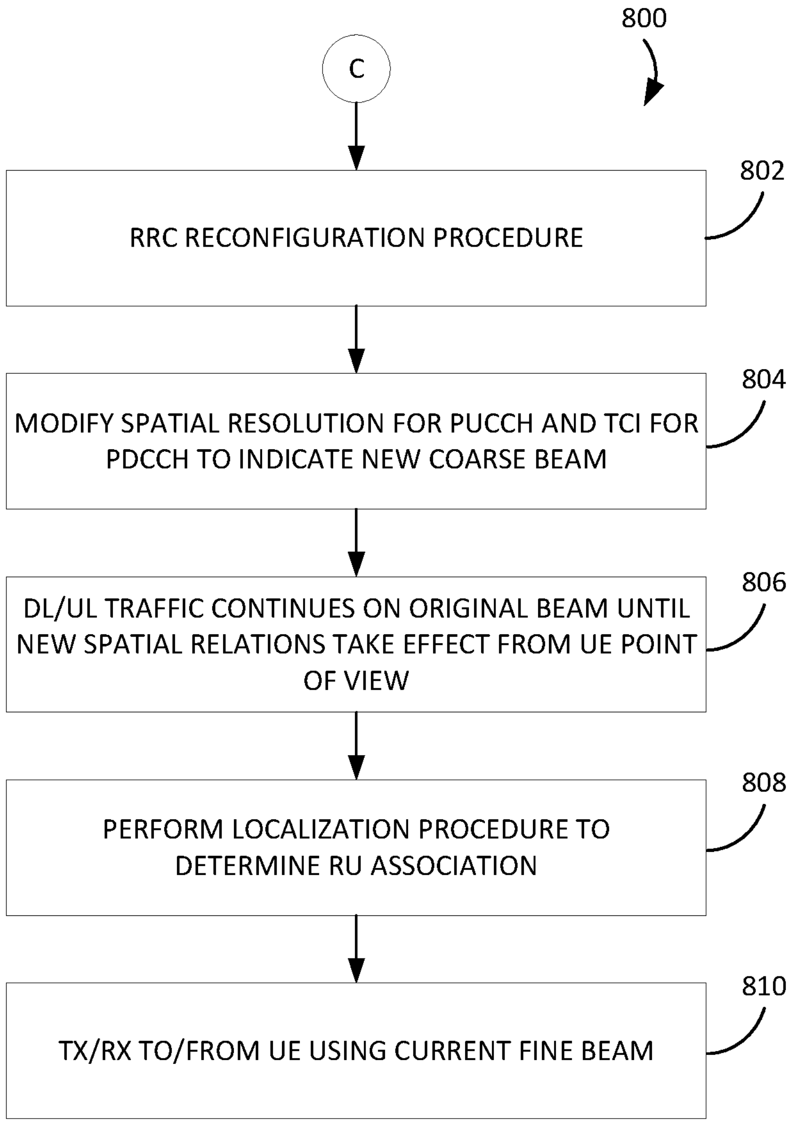
FIG. 8 is a flow diagram of an example method for a third type of beam change.

FIG. 8 is a flow diagram of an example method 800 for a third type of beam change. The common features discussed above with respect to the base stations in FIGS. 1A-5 can include similar characteristics to those discussed with respect to method 800 and vice versa. In some examples, the method 800 is performed by a base station (for example, base station 100, 150).

The third type of beam change corresponds to a situation where the coarse beam is changed, but not the fine beam. Such a situation may arise, for example, where there is overlap between coarse beams. Blocks 802, 804, 806, and 808 of the method 800 shown in FIG. 8 correspond to blocks 702, 704, 706, and 710 of the method 700 shown in FIG. 7. Only the differences between method 800 and method 700 are discussed below.

Since the fine beam is not changed for the third type of beam change, blocks 708 and 712 related to switching the UE-specific CSI-RS resource and the transmission/reception to/from the UE to the new fine beam are omitted from the method 800. Following completion of the localization procedure, the method 800 further includes continuing transmission/reception to/from the UE using the current fine beam (block 810).

Figure 9:
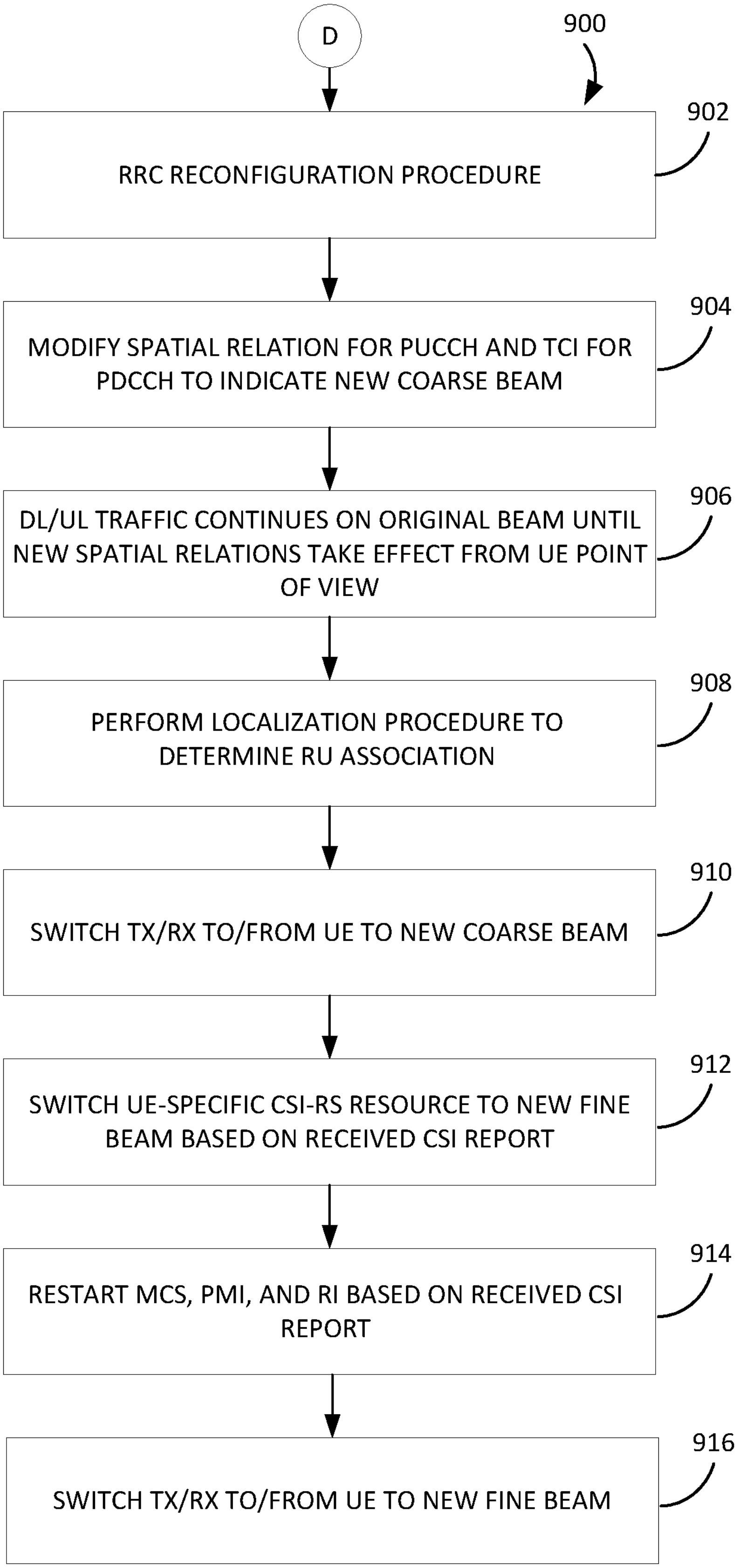
FIG. 9 is a flow diagram of an example method for a fourth type of beam change.

FIG. 9 is a flow diagram of an example method 900 for a fourth type of beam change. The common features discussed above with respect to the base stations in FIGS. 1A-5 can include similar characteristics to those discussed with respect to method 900 and vice versa. In some examples, the method 900 is performed by a base station (for example, base station 100, 150).

The fourth type of beam change corresponds to a situation where the coarse beam and the fine beam are changed, and the new coarse beam is not a true neighbor of the previous coarse beam. Such a situation may arise, for example, due to the reflection and/or scattering environment in the deployment. Blocks 902, 904, and 906 of the method 900 shown in FIG. 9 correspond to blocks 702, 704, 706 of the method 700 shown in FIG. 7. Only the differences between method 900 and method 700 are discussed below.

Since the new coarse beam is not a true neighbor of the previous coarse beam, the previous CSI-RS reporting by the UE is not applicable to the new fine beam that is to be used. The localization procedure for block 908 is similar to the localization procedure for block 710 except the new coarse beam is used in the method 900 instead of the new fine beam for method 700. In examples where the new coarse beam is associated with a different RU than the previous coarse beam, the localization procedure will result in a new RU association.

In some examples, such as the example shown in FIG. 1A with a single RU 106, block 908 may not be performed since it is not needed due to the UEs necessarily being associated with the single RU 106 included in the base station 100.

Also, rather than switching the UE-specific CSI-RS resource prior to the localization procedure as described above with respect to method 700 shown in FIG. 7, the method 900 further includes switching transmission/reception to/from the UE to the new coarse beam (block 910). In some examples, the new coarse beam is utilized for transmission to/from the UE until a CSI report is received from the UE and the particular new fine beam is determined. In some examples, for such transmissions over the new coarse beam, the UE's accumulated link adaptation (for example, SINR estimate for each layer (that is converted to MCS)) is backed off by 6 dB.

The method 900 further includes switching a UE-specific CSI-RS resource to a new fine beam based on the received CSI report from the UE (block 912). That is, the base station is configured to switch the UE-specific CSI-RS resource from being transmitted using the current fine beam to being transmitted using the new fine beam. In some examples, the UE-specific CSI-RS resource is provided to the UE in same downlink slot that includes synchronization signals for the coarse beam and the references signals for the fine beams as described above with respect to FIG. 4B.

The method 900 further includes restarting MCS, PMI, and RI based on the received CSI report from the UE (block 914) and switching transmission/reception to/from the UE to the new fine beam (block 914). That is, the base station is configured to switch from the current fine beam to the new fine beam for further communications with the UE. In some examples, the new fine beam is associated with the same coarse beam as the current fine beam, so it is in the same set of fine beams for which the UE has provided reference signal measurements to the base station.

Since the new coarse beam is not a true neighbor, it would not already be in the current TCI list of the UE. Therefore, unlike for method 700, block 904 cannot be performed in parallel to block 902.

Figure 9A:
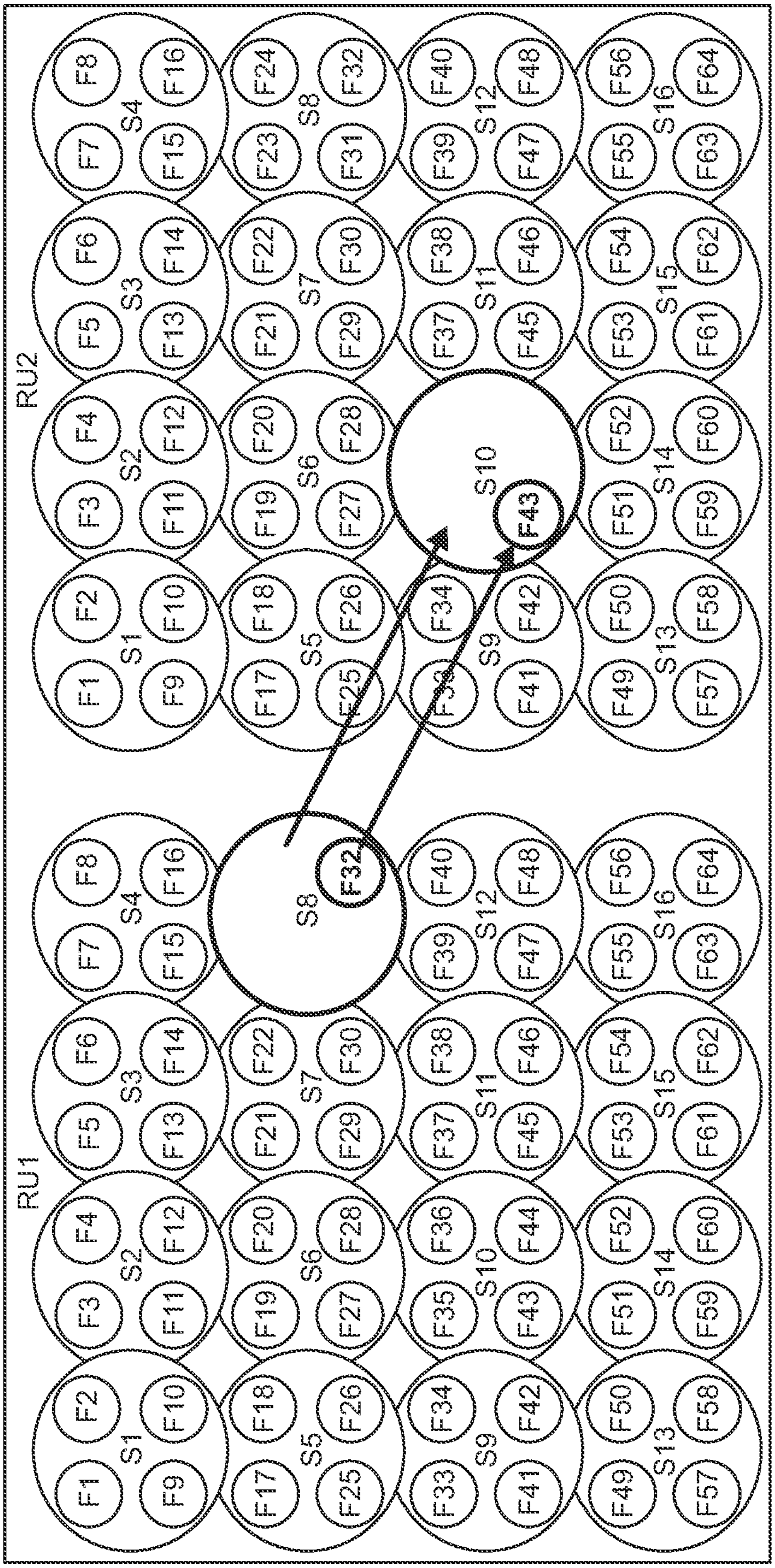
FIG. 9A is a diagram of the fourth type of beam change.
Figure 9B:
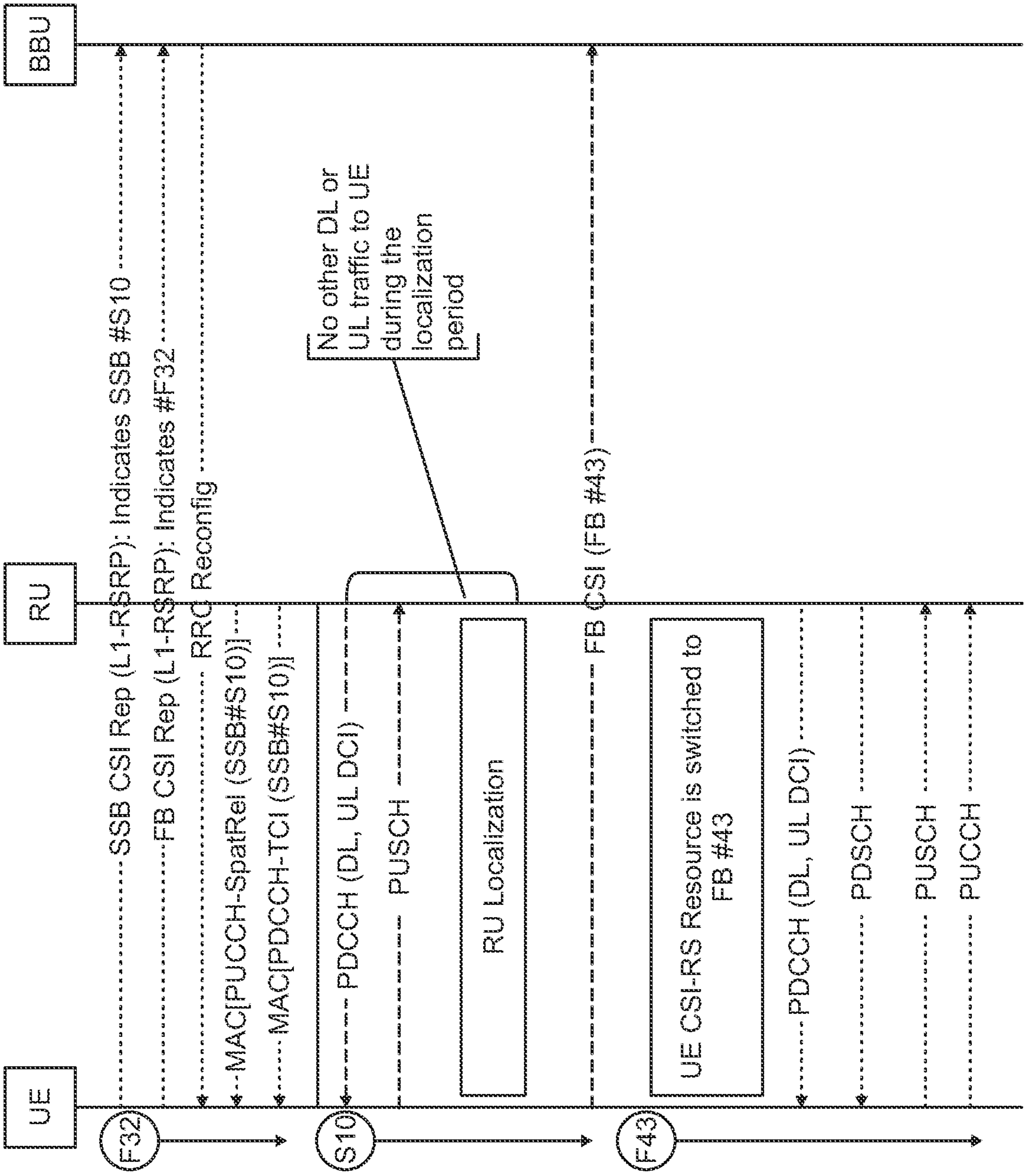
FIG. 9B is a sequence diagram for the fourth type of beam change.

FIG. 9A is a diagram showing a particular example of the fourth type of beam change scenario corresponding to method 900, and FIG. 9B is a sequence diagram showing the communications and sequence of operations for the particular example shown in FIG. 9A. In the example shown in FIG. 9A, the coarse beams are labeled S1, S2, etc. and the fine beams are labeled F1, F2, etc. Further, in the example shown in FIG. 9A, there are two RUs shown (RU1 and RU2).

In the example shown in FIGS. 9A-9B, the UE is currently associated with coarse beam S8 and fine beam F32 of RU1 and using the fine beam F32 of RU1 for communication between the UE and the RU. In the example shown in FIGS. 9A-9B, a determination is made that a new coarse beam S10 is to be used based on the SSB CSI report, but the same fine beam F32 is to be used based on the fine beam CSI report. As shown in FIG. 9B, an RRC reconfiguration is performed, and the MAC-CEs are used to modify the spatial relation for PUCCH and the TCI for PDCCH to denote the new coarse beam S10. Until the new spatial relation is valid, downlink/uplink traffic continues using the current fine beam F32. After the new spatial relation is valid, a PUSCH transmission is scheduled for the UE and sent using the coarse beam S10, and the UE PUSCH transmission is received and processed for RU localization. As noted in FIG. 9B, no other downlink or uplink traffic is scheduled with the UE by the BBU during the localization period. The transmission/reception to/from the UE uses the new coarse beam S10 until the new fine beam is selected. As shown in FIG. 9B, a determination is made that a new fine beam F43 is to be used based on the fine beam CSI report, and the UE CSI-RS resource is switched to the new fine beam F43. It should be noted that MCS corrections are performed for the fourth type of beam change, and the new CQI/PMI/RI for the new fine beam needs to be taken into account for link adaptation.

The methods and techniques described above can be duplicated for each user equipment being serviced by the base station in order to provide synchronization signals and data signals using a coarse beam and a fine beam.

Other examples are implemented in other ways.

The example techniques described herein utilize two-level beam management for communications with user equipment in a cell. By associating a user equipment with a coarse beam for synchronization signals and a fine beam for data signals, the techniques described herein enable better resource management and coverage of the entire cell area while also providing better performance compared to techniques that utilize single-level beam management.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a system, comprising: at least one baseband unit (BBU); a radio unit communicatively coupled to the at least one BBU; and a plurality of antennas communicatively coupled to the radio unit; wherein the at least one BBU, the radio unit, and the plurality of antennas are configured to implement a base station for wirelessly communicating with user equipment in a cell; wherein the base station is configured to: receive signal measurements for a plurality of coarse beams from a first user equipment; establish a coarse beam association for a first user equipment with a first coarse beam of the plurality of coarse beams based on the signal measurements for the plurality of coarse beams from the first user equipment; configure the first user equipment to measure reference signals associated with a first set of fine beams, wherein the first set of fine beams is associated with the first coarse beam; receive reference signal measurements for the first set of fine beams from the first user equipment; establish a fine beam association for the first user equipment with a first fine beam of the first set of fine beams based on the reference signal measurements for the first set of fine beams from the first user equipment; transmit synchronization signals to first user equipment using the first coarse beam; and transmit data signals to the first user equipment using the first fine beam.

Example 2 includes the system of Example 1, wherein the base station is further configured to: switch the coarse beam association based on updated signal measurements for the plurality of coarse beams from the first user equipment; and/or switch the fine beam association based on updated reference signal measurements for the first set of fine beams from the first user equipment.

Example 3 includes the system of any of Examples 1-2, wherein the base station is further configured to: determine whether a second coarse beam is to be used for the coarse beam association for the first user equipment based on updated signal measurements for the plurality of coarse beams from the first user equipment; in response to a determination that the second coarse beam is not be used for the coarse beam association with the first user equipment, determine whether a second fine beam of the first set of fine beams is to be used for the fine beam association with the first user equipment based on updated reference signal measurements from the first user equipment; and in response to a determination that the second fine beam of the first set of fine beams is to be used for the fine beam association with the first user equipment, switch the fine beam association for the first user equipment from the first fine beam of the first set of fine beams to the second fine beam of the first set of fine beams.

Example 4 includes the system of any of Examples 1-3, wherein the base station is further configured to: determine whether a second coarse beam is to be used for the coarse beam association for the first user equipment based on updated signal measurements for the plurality of coarse beams from the first user equipment; in response to a determination that the second coarse beam is to be used for the coarse beam association with the first user equipment, determine whether the second coarse beam is a true neighbor of the first coarse beam; and in response to a determination that the second coarse beam is not a true neighbor of the first coarse beam, switch the coarse beam association for the first user equipment from the first coarse beam to the second coarse beam and switch the fine beam association for the first user equipment from the first fine beam of the first set of fine beams to a second fine beam of a second set of fine beams, wherein the second set of fine beams is associated with the second coarse beam.

Example 5 includes the system of any of Examples 1-4, wherein the base station is further configured to: determine whether a second coarse beam is to be used for the coarse beam association for the first user equipment based on updated signal measurements for the plurality of coarse beams from the first user equipment; in response to a determination that the second coarse beam is to be used for the coarse beam association with the first user equipment, determine whether the second coarse beam is a true neighbor of the first coarse beam; and in response to a determination that the second coarse beam is a true neighbor of the first coarse beam, determine whether a second fine beam different than the first fine beam is to be used for the fine beam association with the first user equipment based on updated reference signal measurements from the first user equipment.

Example 6 includes the system of Example 5, wherein the base station is further configured to: in response to a determination that a second fine beam different than the first fine beam is to be used for the fine beam association with the first user equipment, switch the coarse beam association for the first user equipment from the first coarse beam to the second coarse beam and switch the fine beam association for the first user equipment from the first fine beam of the first set of fine beams to the second fine beam.

Example 7 includes the system of Example 6, wherein the second fine beam is a second fine beam of the first set of fine beams or a second fine beam of a second set of fine beams, wherein the second set of fine beams is associated with the second coarse beam.

Example 8 includes the system of any of Examples 5-7, wherein the base station is further configured to: in response to a determination that a second fine beam different than the first fine beam is not to be used for the fine beam association with the first user equipment based on the updated reference signal measurements from the first user equipment, switch the coarse beam association for the first user equipment from the first coarse beam to the second coarse beam.

Example 9 includes the system of any of Examples 1-8, wherein the signal measurements for the plurality of coarse beams from the first user equipment include Layer 1-Reference Signal Received Power (L1-RSRP) measurements, wherein the reference signals associated with the first set of fine beams include Channel State Information-Reference Signals (CSI-RSs), wherein the reference signal measurements for the first set of fine beams include L1-RSRP measurements, wherein the synchronization signals include a Synchronization Signal Block (SSB).

Example 10 includes the system of any of Examples 1-9, wherein the base station is further configured to: transmit a user equipment-specific reference signal to the first user equipment using the first fine beam of the first set of fine beams; and receive a channel quality index (CQI), a precoding matrix indicator (PMI), and/or a rank indicator (RI) from the first user equipment.

Example 11 includes the system of Example 10, wherein the base station is configured to receive the signal measurements for a plurality of coarse beams, the reference signal measurements for the first set of fine beams, the CQI, the PMI, and the RI using a repeating uplink resource allocated to the first user equipment.

Example 12 includes the system of any of Examples 1-11, wherein each coarse beam of the plurality of coarse beams is wider than each fine beam utilized by the base station, wherein the base station is configured to utilize more fine beams than coarse beams.

Example 13 includes a method of two-level beam management for a base station that includes at least one baseband unit (BBU) and a radio unit communicatively coupled to the at least one BBU, the method comprising: receiving signal measurements for a plurality of coarse beams from a first user equipment; establishing a coarse beam association for a first user equipment with a first coarse beam of the plurality of coarse beams based on the signal measurements for the plurality of coarse beams from the first user equipment; configuring the first user equipment to measure reference signals associated with a first set of fine beams, wherein the first set of fine beams is associated with the first coarse beam; receiving reference signal measurements for the first set of fine beams from the first user equipment; establishing a fine beam association for the first user equipment with a first fine beam of the first set of fine beams based on the reference signal measurements for the first set of fine beams from the first user equipment; transmitting synchronization signals to the first user equipment using the first coarse beam; and transmitting data signals to first user equipment using the first fine beam.

Example 14 includes the method of Example 13, further comprising: switching the coarse beam association based on updated signal measurements for the plurality of coarse beams from the first user equipment; and/or switching the fine beam association based on updated reference signal measurements for the first set of fine beams from the first user equipment.

Example 15 includes the method of any of Examples 13-14, further comprising: determining whether a second coarse beam is to be used for the coarse beam association for the first user equipment based on updated signal measurements for the plurality of coarse beams from the first user equipment; in response to a determination that the second coarse beam is not be used for the coarse beam association with the first user equipment, determining whether a second fine beam of the first set of fine beams is to be used for the fine beam association with the first user equipment based on updated reference signal measurements from the first user equipment; and in response to a determination that the second fine beam of the first set of fine beams is to be used for the fine beam association with the first user equipment, switching the fine beam association for the first user equipment from the first fine beam of the first set of fine beams to the second fine beam of the first set of fine beams.

Example 16 includes the method of any of Examples 13-15, further comprising: determining whether a second coarse beam is to be used for the coarse beam association for the first user equipment based on updated signal measurements for the plurality of coarse beams from the first user equipment; in response to a determination that the second coarse beam is to be used for the coarse beam association with the first user equipment, determining whether the second coarse beam is a true neighbor of the first coarse beam; and in response to a determination that the second coarse beam is not a true neighbor of the first coarse beam, switching the coarse beam association for the first user equipment from the first coarse beam to the second coarse beam and switch the fine beam association for the first user equipment from the first fine beam of the first set of fine beams to a second fine beam of a second set of fine beams, wherein the second set of fine beams is associated with the second coarse beam.

Example 17 includes the method of any of Examples 13-16, further comprising: determining whether a second coarse beam is to be used for the coarse beam association for the first user equipment based on updated signal measurements for the plurality of coarse beams from the first user equipment; in response to a determination that the second coarse beam is to be used for the coarse beam association with the first user equipment, determining whether the second coarse beam is a true neighbor of the first coarse beam; and in response to a determination that the second coarse beam is a true neighbor of the first coarse beam, determining whether a second fine beam different than the first fine beam is to be used for the fine beam association with the first user equipment based on updated reference signal measurements from the first user equipment.

Example 18 includes the method of Example 17, further comprising: in response to a determination that a second fine beam different than the first fine beam is to be used for the fine beam association with the first user equipment, switching the coarse beam association for the first user equipment from the first coarse beam to the second coarse beam and switch the fine beam association for the first user equipment from the first fine beam of the first set of fine beams to the second fine beam.

Example 19 includes the method of any of Examples 17-18, further comprising: in response to a determination that a second fine beam different than the first fine beam is not to be used for the fine beam association with the first user equipment based on the updated reference signal measurements from the first user equipment, switching the coarse beam association for the first user equipment from the first coarse beam to the second coarse beam.

Example 20 includes the method of any of Examples 13-19, further comprising: transmitting a user equipment-specific reference signal to the first user equipment using the first fine beam of the first set of fine beams; and receiving a channel quality index (CQI), a precoding matrix indicator (PMI), and/or a rank indicator (RI) from the first user equipment.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:

at least one baseband unit (BBU);

a radio unit communicatively coupled to the at least one BBU; and a plurality of antennas communicatively coupled to the radio unit;

wherein the at least one BBU, the radio unit, and the plurality of antennas are configured to implement a base station for wirelessly communicating with user equipment in a cell;

wherein the base station is configured to:

receive signal measurements for a plurality of coarse beams from a first user equipment;

establish a coarse beam association for the first user equipment with a first coarse beam of the plurality of coarse beams based on the signal measurements for the plurality of coarse beams from the first user equipment;

configure the first user equipment to measure reference signals associated with a first set of fine beams, wherein the first set of fine beams is associated with the first coarse beam;

receive reference signal measurements for the first set of fine beams from the first user equipment;

establish a fine beam association for the first user equipment with a first fine beam of the first set of fine beams based on the reference signal measurements for the first set of fine beams from the first user equipment;

transmit synchronization signals to the first user equipment using the first coarse beam; and transmit data signals to the first user equipment using the first fine beam.

2. The system of claim 1, wherein the base station is further configured to:

switch the coarse beam association based on updated signal measurements for the plurality of coarse beams from the first user equipment; and/or switch the fine beam association based on updated reference signal measurements for the first set of fine beams from the first user equipment.

3. The system of claim 1, wherein the base station is further configured to:

determine whether a second coarse beam is to be used for the coarse beam association for the first user equipment based on updated signal measurements for the plurality of coarse beams from the first user equipment;

in response to a determination that the second coarse beam is not be used for the coarse beam association with the first user equipment, determine whether a second fine beam of the first set of fine beams is to be used for the fine beam association with the first user equipment based on updated reference signal measurements from the first user equipment; and in response to a determination that the second fine beam of the first set of fine beams is to be used for the fine beam association with the first user equipment, switch the fine beam association for the first user equipment from the first fine beam of the first set of fine beams to the second fine beam of the first set of fine beams.

4. The system of claim 1, wherein the base station is further configured to:

determine whether a second coarse beam is to be used for the coarse beam association for the first user equipment based on updated signal measurements for the plurality of coarse beams from the first user equipment;

in response to a determination that the second coarse beam is to be used for the coarse beam association with the first user equipment, determine whether the second coarse beam is a true neighbor of the first coarse beam; and in response to a determination that the second coarse beam is not a true neighbor of the first coarse beam, switch the coarse beam association for the first user equipment from the first coarse beam to the second coarse beam and switch the fine beam association for the first user equipment from the first fine beam of the first set of fine beams to a second fine beam of a second set of fine beams, wherein the second set of fine beams is associated with the second coarse beam.

5. The system of claim 1, wherein the base station is further configured to:

determine whether a second coarse beam is to be used for the coarse beam association for the first user equipment based on updated signal measurements for the plurality of coarse beams from the first user equipment;

in response to a determination that the second coarse beam is to be used for the coarse beam association with the first user equipment, determine whether the second coarse beam is a true neighbor of the first coarse beam; and in response to a determination that the second coarse beam is a true neighbor of the first coarse beam, determine whether a second fine beam different than the first fine beam is to be used for the fine beam association with the first user equipment based on updated reference signal measurements from the first user equipment.

6. The system of claim 5, wherein the base station is further configured to:

in response to a determination that the second fine beam different than the first fine beam is to be used for the fine beam association with the first user equipment, switch the coarse beam association for the first user equipment from the first coarse beam to the second coarse beam and switch the fine beam association for the first user equipment from the first fine beam of the first set of fine beams to the second fine beam.

7. The system of claim 6, wherein the second fine beam is a second fine beam of the first set of fine beams or a second fine beam of a second set of fine beams, wherein the second set of fine beams is associated with the second coarse beam.

8. The system of claim 5, wherein the base station is further configured to:

in response to a determination that the second fine beam different than the first fine beam is not to be used for the fine beam association with the first user equipment based on the updated reference signal measurements from the first user equipment, switch the coarse beam association for the first user equipment from the first coarse beam to the second coarse beam.

9. The system of claim 1, wherein the signal measurements for the plurality of coarse beams from the first user equipment include Layer 1-Reference Signal Received Power (L1-RSRP) measurements, wherein the reference signals associated with the first set of fine beams include Channel State Information-Reference Signals (CSI-RSs), wherein the reference signal measurements for the first set of fine beams include L1-RSRP measurements, wherein the synchronization signals include a Synchronization Signal Block (SSB).

10. The system of claim 1, wherein the base station is further configured to:

transmit a user equipment-specific reference signal to the first user equipment using the first fine beam of the first set of fine beams; and receive a channel quality index (CQI), a precoding matrix indicator (PMI), and/or a rank indicator (RI) from the first user equipment.

11. The system of claim 10, wherein the base station is configured to receive the signal measurements for the plurality of coarse beams, the reference signal measurements for the first set of fine beams, the CQI, the PMI, and the RI using a repeating uplink resource allocated to the first user equipment.

12. The system of claim 1, wherein each coarse beam of the plurality of coarse beams is wider than each fine beam utilized by the base station, wherein the base station is configured to utilize more fine beams than coarse beams.

13. A method of two-level beam management for a base station that includes at least one baseband unit (BBU) and a radio unit communicatively coupled to the at least one BBU, the method comprising:

receiving signal measurements for a plurality of coarse beams from a first user equipment;

establishing a coarse beam association for the first user equipment with a first coarse beam of the plurality of coarse beams based on the signal measurements for the plurality of coarse beams from the first user equipment;

configuring the first user equipment to measure reference signals associated with a first set of fine beams, wherein the first set of fine beams is associated with the first coarse beam;

receiving reference signal measurements for the first set of fine beams from the first user equipment;

establishing a fine beam association for the first user equipment with a first fine beam of the first set of fine beams based on the reference signal measurements for the first set of fine beams from the first user equipment;

transmitting synchronization signals to the first user equipment using the first coarse beam; and transmitting data signals to first user equipment using the first fine beam.

14. The method of claim 13, further comprising:

switching the coarse beam association based on updated signal measurements for the plurality of coarse beams from the first user equipment; and/or switching the fine beam association based on updated reference signal measurements for the first set of fine beams from the first user equipment.

15. The method of claim 13, further comprising:

determining whether a second coarse beam is to be used for the coarse beam association for the first user equipment based on updated signal measurements for the plurality of coarse beams from the first user equipment;

in response to a determination that the second coarse beam is not be used for the coarse beam association with the first user equipment, determining whether a second fine beam of the first set of fine beams is to be used for the fine beam association with the first user equipment based on updated reference signal measurements from the first user equipment; and in response to a determination that the second fine beam of the first set of fine beams is to be used for the fine beam association with the first user equipment, switching the fine beam association for the first user equipment from the first fine beam of the first set of fine beams to the second fine beam of the first set of fine beams.

16. The method of claim 13, further comprising:

determining whether a second coarse beam is to be used for the coarse beam association for the first user equipment based on updated signal measurements for the plurality of coarse beams from the first user equipment;

in response to a determination that the second coarse beam is to be used for the coarse beam association with the first user equipment, determining whether the second coarse beam is a true neighbor of the first coarse beam; and in response to a determination that the second coarse beam is not a true neighbor of the first coarse beam, switching the coarse beam association for the first user equipment from the first coarse beam to the second coarse beam and switch the fine beam association for the first user equipment from the first fine beam of the first set of fine beams to a second fine beam of a second set of fine beams, wherein the second set of fine beams is associated with the second coarse beam.

17. The method of claim 13, further comprising:

determining whether a second coarse beam is to be used for the coarse beam association for the first user equipment based on updated signal measurements for the plurality of coarse beams from the first user equipment;

in response to a determination that the second coarse beam is to be used for the coarse beam association with the first user equipment, determining whether the second coarse beam is a true neighbor of the first coarse beam; and in response to a determination that the second coarse beam is a true neighbor of the first coarse beam, determining whether a second fine beam different than the first fine beam is to be used for the fine beam association with the first user equipment based on updated reference signal measurements from the first user equipment.

18. The method of claim 17, further comprising:

in response to a determination that the second fine beam different than the first fine beam is to be used for the fine beam association with the first user equipment, switching the coarse beam association for the first user equipment from the first coarse beam to the second coarse beam and switch the fine beam association for the first user equipment from the first fine beam of the first set of fine beams to the second fine beam.

19. The method of claim 17, further comprising:

in response to a determination that the second fine beam different than the first fine beam is not to be used for the fine beam association with the first user equipment based on the updated reference signal measurements from the first user equipment, switching the coarse beam association for the first user equipment from the first coarse beam to the second coarse beam.

20. The method of claim 13, further comprising:

transmitting a user equipment-specific reference signal to the first user equipment using the first fine beam of the first set of fine beams; and receiving a channel quality index (CQI), a precoding matrix indicator (PMI), and/or a rank indicator (RI) from the first user equipment.

* * * * *